(12) United States Patent
Li et al.

(10) Patent No.: US 9,377,989 B2
(45) Date of Patent: Jun. 28, 2016

(54) INFORMATION PROCESSING METHOD FOR SLICING AND DISPLAYING OBJECT AND ELECTRIC DEVICE FOR IMPLEMENTING THE SAME

(71) Applicant: LENOVO (BEIJING) LIMITED, Beijing (CN)

(72) Inventors: Fanzhi Li, Beijing (CN); Hao Liu, Beijing (CN); Qiang Guo, Beijing (CN); Mingxu Mao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 189 days.

(21) Appl. No.: 14/228,929

(22) Filed: Mar. 28, 2014

(65) Prior Publication Data
US 2015/0091779 A1    Apr. 2, 2015

(30) Foreign Application Priority Data

Sep. 27, 2013 (CN) .......................... 2013 1 0452820
Sep. 27, 2013 (CN) .......................... 2013 1 0452839

(51) Int. Cl.
*G06F 3/14*    (2006.01)

(52) U.S. Cl.
CPC ............ *G06F 3/1446* (2013.01); *G06F 3/1423* (2013.01); *G06F 3/1454* (2013.01); *G09G 2320/08* (2013.01); *G09G 2356/00* (2013.01)

(58) Field of Classification Search
CPC ....... G06F 3/14; G06F 3/1431; G06F 3/1407; G06F 3/1423; G06F 3/147; G06F 3/1446; G06F 1/1692; G06F 1/1654; G06F 3/1438; G06F 3/03545; G06F 3/044; G06F 3/0416; G06F 3/04883; G06F 3/0488; G06F 3/041; G06F 3/0412; G06F 3/04886; G06F 3/0317; G06F 3/046; G06F 3/04815; G06F 3/0235; G06F 3/0418; G06F 3/042; G06F 3/03547; G06F 3/0421; G06F 3/038; G06F 3/03542; G06F 3/011; G06F 3/0383; G06F 3/0202; G06F 2203/04808; G06F 2203/04106; G06F 2203/04104; G06F 2203/04101; G06F 2203/04108; G06F 2203/0384; G06F 2203/04807; G06F 2203/0411; G06F 2203/0381; G06F 1/1626; G06F 1/1643; G06F 1/1684; G06F 3/1454; G09G 2300/023; G09G 2360/04; G09G 2300/026; G09G 2356/00; G09G 2320/08

See application file for complete search history.

(56) References Cited

U.S. PATENT DOCUMENTS

2005/0168399 A1* 8/2005 Palmquist ............. G06F 1/1601
                                                     345/1.1
2011/0109526 A1* 5/2011 Bauza ................... G06F 3/1446
                                                     345/1.3

(Continued)

OTHER PUBLICATIONS

Want, R., Intel Res., Santa Clara, CA, USA; An introduction to RFID technology, 2006, Pervasive Computing, IEEE (vol. 5, Issue: 1).*

*Primary Examiner* — Dwayne Bost
*Assistant Examiner* — Ivelisse Martinez Quiles
(74) *Attorney, Agent, or Firm* — Scully Scott Murphy & Presser

(57) ABSTRACT

An information processing method and device is provided. According to the method, a first position parameter of a first device and a second position parameter of a second device are acquired. Based on the position parameters, whether a relative position relationship between the first device and the second device meets a preset condition is judged to acquire a result. If the judgment result is positive, the first device communicates with the second device, data of a first part of a first object to be displayed on the first device is acquired, a first application program corresponding to the first object in the second device is synchronously executed, and the data of the first part of the first object is displayed on the first device while data of a second part of the first object is displayed on the second device.

16 Claims, 5 Drawing Sheets

(56) References Cited

U.S. PATENT DOCUMENTS

| | | | | |
|---|---|---|---|---|
| 2012/0062442 A1* | 3/2012 | Locker | G06F 3/1446 | 345/1.3 |
| 2012/0062475 A1* | 3/2012 | Locker | G06F 3/041 | 345/173 |
| 2012/0206319 A1* | 8/2012 | Lucero | H04N 21/4788 | 345/1.3 |
| 2012/0242596 A1* | 9/2012 | Sip | G06F 3/04883 | 345/173 |
| 2013/0027431 A1* | 1/2013 | Chu | G06F 3/1446 | 345/644 |
| 2013/0111369 A1* | 5/2013 | Pasquero | G06F 3/0481 | 715/761 |
| 2013/0111370 A1* | 5/2013 | Pasquero | G06F 3/0481 | 715/761 |
| 2013/0176255 A1* | 7/2013 | Kim | G06F 3/1423 | 345/173 |
| 2013/0201097 A1* | 8/2013 | Pasquero | G06F 3/0488 | 345/156 |
| 2013/0241954 A1* | 9/2013 | Yu | G06F 3/1446 | 345/629 |
| 2013/0302763 A1* | 11/2013 | Edwards | G09B 1/36 | 434/159 |
| 2014/0002327 A1* | 1/2014 | Toren | G06F 3/1423 | 345/1.1 |
| 2014/0104139 A1* | 4/2014 | Buchner | G06F 3/1446 | 345/1.3 |
| 2014/0232616 A1* | 8/2014 | Drake | G06T 13/80 | 345/1.2 |
| 2014/0302773 A1* | 10/2014 | Jantunen | H04W 8/005 | 455/3.01 |
| 2014/0313103 A1* | 10/2014 | Goel | G06T 3/1454 | 345/2.2 |
| 2014/0320387 A1* | 10/2014 | Eriksson | G06F 3/017 | 345/156 |
| 2014/0380187 A1* | 12/2014 | Gardenfors | G06F 3/017 | 715/748 |
| 2015/0084837 A1* | 3/2015 | Mese | G06F 3/1446 | 345/1.3 |

* cited by examiner

INFORMATION PROCESSING METHOD FOR SLICING AND DISPLAYING OBJECT AND ELECTRIC DEVICE FOR IMPLEMENTING THE SAME

TECHNICAL FIELD

The disclosure relates to the field of information processing, and more particularly, to information processing methods and electronic devices.

BACKGROUND

With the rapid development of the electronic age, a growing number of electronic devices are introduced to people's lives and works, bringing great convenience to people.

Users often execute multiple application programs on one electronic device simultaneously, and thus can make switches and calls between the multiple programs, enhancing the operation efficiency of the electronic devices. Relative to enabling multiple programs to be executed in one electronic device, enabling one program to be executed in multiple electronic devices relates to a more complex technology, and provides a new application scenario at the same time. For example, two display screens of two tablet computers are spliced into one display screen by using a slicing technology for the two tablet computers. Since the display screen becomes larger, a better visual effect can be achieved by a user when browsing a webpage or viewing a video on this display screen.

In order to splice the two electronic devices together for display of output content of an application program, so as to achieve executing the same program on the two electronic devices, a user needs to set the two electronic devices manually, so as to enable splicing two display screens of the two electronic devices into one display screen. For example, there is one solution as follows.

When it needs to display the same image collectively on two electronic devices, if the first electronic device is placed on the left side of the second electronic device, a user needs to continuously slide a finger or a stylus from a screen edge of the first electronic device to a screen of the second electronic device. Thus, the first electronic device will display the left half of the image, and the second electronic device will display the right half of the image, displaying two pictures, i.e., the left half and the right half of the image, on a spliced screen.

However, the inventors of the present application found at least the following technical problems as described above in the process of implementing the technical solutions of the embodiments of the present application.

When two electronic devices are placed together, for example, when a first electronic device is placed on the left side of a second electronic device, a user needs to continuously slide a finger or a stylus from a screen edge of the first electronic device to a screen of the second electronic device, to enable the two electronic devices to be spliced together for display of output content of an application program, so as to achieve executing the same program on the two electronic devices. Thus, there is a technical problem that when two electronic devices are placed together, they cannot be spliced together automatically for display of output content of an application program, so as to achieve executing the same program on the two electronic devices.

SUMMARY

Embodiments of the present application provide information processing methods and electronic devices, solving the technical problem that when two electronic devices are placed together, they cannot be spliced together automatically for display of output content of an application program, so as to achieve executing the same program on the two electronic devices.

The embodiments of the present application provide an information processing method applied in a first electronic device including a first display unit and capable of communicating with a second electronic device including a second display unit. The method includes: acquiring a first position parameter of the first electronic device and a second position parameter of the second electronic device; judging, based on the first position parameter and the second position parameter, whether a relative position relationship between the first electronic device and the second electronic device meets a preset condition, to acquire a first judgment result; when the first judgment result is YES, establishing, by the first electronic device, a communication connection with the second electronic device; acquiring data of a first part of a first object needed to be displayed on the first display unit; and synchronously executing a first application program corresponding to the first object in the second electronic device, and displaying the data of the first part on the first display unit while displaying data of a second part in the first object different from the data of the first part on the second display unit.

Alternatively, before said acquiring a first position parameter of the first electronic device and a second position parameter of the second electronic device, the method further includes: synchronizing, by the first electronic device with the second electronic device.

Alternatively, said synchronizing, by the first electronic device with the second electronic device further includes: synchronizing the first electronic device with the second electronic device through a first timeline module in the first electronic device and a second timeline module in the second electronic device.

Alternatively, when or after said synchronizing the first electronic device with the second electronic device through a first timeline module in the first electronic device and a second timeline module in the second electronic device, the method further includes: acquiring a device time difference value representing a time difference between the first electronic device and the second electronic device.

Alternatively, said acquiring a first position parameter of the first electronic device and a second position parameter of the second electronic device further includes: detecting to acquire the first position parameter of the first electronic device during a first motion, the first position parameter including a first direction of the first motion and a first start time and a first end time corresponding to the first motion; and acquiring the second position parameter of the second electronic device during a second motion from the second electronic device, the second position parameter including a second direction of the second motion and a second start time and a second end time corresponding to the second motion.

Alternatively, after said acquiring a first position parameter of the first electronic device and a second position parameter of the second electronic device, the method further includes: detecting to acquire a first distance value between the first electronic device and the second electronic device at a third time after the first end time and the second end time.

Alternatively, said judging, based on the first position parameter and the second position parameter, whether a relative position relationship between the first electronic device and the second electronic device meets a preset condition to acquire a first judgment result further includes: judging whether the first direction is opposite to the second direction, to acquire a second judgment result; when the second judgment result is YES, judging whether a first time difference value between the first start time and the second start time is equal to the device time difference value, to acquire a third judgment result; and when the third judgment result is YES, judging whether the first distance value is smaller than a preset distance value, to acquire the first judgment result.

Alternatively, said judging, based on the first position parameter and the second position parameter, whether a relative position relationship between the first electronic device and the second electronic device meets a preset condition to acquire a first judgment result further includes: judging whether the first direction is opposite to the second direction, to acquire a second judgment result; when the second judgment result is YES, judging whether a second time difference value between the first end time and the second end time is equal to the device time difference value, to acquire a fourth judgment result; and when the fourth judgment result is YES, judging whether the first distance value is smaller than a preset distance value, to acquire the first judgment result.

Alternatively, said judging, based on the first position parameter and the second position parameter, whether a relative position relationship between the first electronic device and the second electronic device meets a preset condition to acquire a first judgment result further includes: judging whether the first direction is opposite to the second direction, to acquire a second judgment result; when the second judgment result is YES, judging whether a first time difference value between the first start time and the second start time is equal to the device time difference value, to acquire a third judgment result; when the third judgment result is YES, judging whether a second time difference value between the first end time and the second end time is equal to the device time difference value, to acquire a fifth judgment result; and when the fifth judgment result is YES, judging whether the first distance value is smaller than a preset distance value, to acquire the first judgment result.

Alternatively, said acquiring a first position parameter of the first electronic device and a second position parameter of the second electronic device further includes: detecting to acquire the first position parameter of a first trigger sensor arranged at a first position in the first electronic device, the first position parameter including a signal parameter representing whether there is a first induced current signal passing through the first trigger sensor; and detecting to acquire the second position parameter of a second trigger sensor arranged at a second position in the second electronic device, the second position parameter including a signal parameter representing whether there is a second induced current signal corresponding to the first induced current signal passing through the second trigger sensor.

Alternatively, said judging, based on the first position parameter and the second position parameter, whether a relative position relationship between the first electronic device and the second electronic device meets a preset condition to acquire a first judgment result further includes: when the first position parameter indicates that there is the first induced current signal passing through the first trigger sensor and the second position parameter indicates that there is the second induced current signal passing through the second trigger sensor, judging whether the first position and the second position are in a preset correspondence relationship, to acquire the first judgment result.

Alternatively, each of the first trigger sensor and the second trigger sensor is an inductive sensor.

Alternatively, before said acquiring a first position parameter of the first electronic device and a second position parameter of the second electronic device, the method further includes: acquiring a fixed distance value between first audio output means and second audio output means of the second electronic device from the second electronic device.

Alternatively, said acquiring a first position parameter of the first electronic device and a second position parameter of the second electronic device further includes: acquiring the second position parameter from the second electronic device, the second position parameter including a first time when the first audio output means outputs first audio information and a second time when the second audio output means outputs second audio information which are determined by the second electronic device; and detecting to acquire the first position parameter of the first electronic device after the first time and the second time, the first position parameter including a third time when first audio reception means of the first electronic device receives the first audio information and a fourth time when the first audio reception means receives the second audio information.

Alternatively, after said acquiring a first position parameter of the first electronic device and a second position parameter of the second electronic device, the method further includes: acquiring a second distance value between the first audio output means and the first audio reception means based on the first time and the third time; acquiring a third distance value between the second audio output means and the first audio reception means based on the second time and the fourth time; and acquiring a first angle of the second electronic device relative to the first electronic device based on the second distance value, the third distance value and the fixed distance value.

Alternatively, said judging, based on the first position parameter and the second position parameter, whether a relative position relationship between the first electronic device and the second electronic device meets a preset condition to acquire a first judgment result further includes: judging whether the second distance value and the third distance value are within a preset distance range, to acquire a sixth judgment result; and when the sixth judgment result is YES, judging whether the first angle is within a preset angle range, to acquire the first judgment result.

The embodiments of the present application further provide a first electronic device including a first display unit and being capable of communicating with a second electronic device including a second display unit. The first electronic device includes: a first acquisition unit configured to acquire a first position parameter of the first electronic device and a second position parameter of the second electronic device; a first judgment unit configured to judge, based on the first position parameter and the second position parameter, whether a relative position relationship between the first electronic device and the second electronic device meets a preset condition, to acquire a first judgment result; a first connection unit configured to establish a communication connection between the first electronic device and the second electronic device when the first judgment result is YES; a second acquisition unit configured to acquire data of a first part of a first object needed to be displayed on the first display unit; and a first processing unit configured to synchronously execute a first application program corresponding to the first object in the second electronic device, and display the data of the first part on the first display unit while displaying data of a second part in the first object different from the data of the first part on the second display unit.

Alternatively, the first electronic device further includes: a time synchronization unit configured to synchronize the first electronic device with the second electronic device before the first position parameter of the first electronic device and the second position parameter of the second electronic device are acquired.

Alternatively, the first synchronization unit is further configured to synchronize the first electronic device with the second electronic device through a first timeline module in the first electronic device and a second timeline module in the second electronic device.

Alternatively, the first electronic device further includes: a third acquisition unit configured to acquire a device time difference value representing a time difference between the first electronic device and the second electronic device when or after the first electronic device is synchronized with the second electronic device through a first timeline module in the first electronic device and a second timeline module in the second electronic device.

Alternatively, the first acquisition unit further includes: a first acquisition sub-unit configured to detect to acquire the first position parameter of the first electronic device during a first motion, the first position parameter including a first direction of the first motion and a first start time and a first end time corresponding to the first motion; and a second acquisition sub-unit configured to acquire the second position parameter of the second electronic device during a second motion from the second electronic device, the second position parameter including a second direction of the second motion and a second start time and a second end time corresponding to the second motion.

Alternatively, the first electronic device further includes: a fourth acquisition unit configured to detect to acquire a first distance value between the first electronic device and the second electronic device at a third time after the first end time and the second end time after the first position parameter of the first electronic device and the second position parameter of the second electronic device are acquired.

Alternatively, the first judgment unit further includes: a second judgment sub-unit configured to judge whether the first direction is opposite to the second direction, to acquire a second judgment result; a third judgment sub-unit configured to judge whether a first time difference value between the first start time and the second start time is equal to the device time difference value to acquire a third judgment result when the second judgment result is YES; a first judgment sub-unit configured to judge whether the first distance value is smaller than a preset distance value to acquire the first judgment result when the third judgment result is YES.

Alternatively, the first judgment unit further includes: a second judgment sub-unit configured to judge whether the first direction is opposite to the second direction, to acquire a second judgment result; a fourth judgment sub-unit configured to judge whether a second time difference value between the first end time and the second end time is equal to the device time difference value to acquire a fourth judgment result when the second judgment result is YES; and a first judgment sub-unit configured to judge whether the first distance value is smaller than a preset distance value to acquire the first judgment result when the fourth judgment result is YES.

Alternatively, the first judgment unit further includes: a second judgment sub-unit configured to judge whether the first direction is opposite to the second direction, to acquire a second judgment result; a third judgment sub-unit configured to judge whether a first time difference value between the first start time and the second start time is equal to the device time difference value, to acquire a third judgment result when the second judgment result is YES; a fifth judgment sub-unit configured to judge whether a second time difference value between the first end time and the second end time is equal to the device time difference value to acquire a fifth judgment result when the third judgment result is YES; a first judgment sub-unit configured to judge whether the first distance value is smaller than a preset distance value to acquire the first judgment result when the fifth judgment result is YES.

Alternatively, the first acquisition unit further includes: a third acquisition sub-unit configured to detect to acquire the first position parameter of a first trigger sensor arranged at a first position in the first electronic device, the first position parameter including a signal parameter representing whether there is a first induced current signal passing through the first trigger sensor; a fourth acquisition sub-unit configured to detect to acquire the second position parameter of a second trigger sensor arranged at a second position in the second electronic device, the second position parameter including a signal parameter representing whether there is a second induced current signal corresponding to the first induced current signal passing through the second trigger sensor.

Alternatively, the first judgment unit further includes: a sixth judgment sub-unit configured to judge whether the first position and the second position are in a preset correspondence relationship to acquire the first judgment result when the first position parameter indicates that there is the first induced current signal passing through the first trigger sensor and the second position parameter indicates that there is the second induced current signal passing through the second trigger sensor.

Alternatively, each of the first trigger sensor and the second trigger sensor is an inductive sensor.

Alternatively, the electronic device further includes: a fifth acquisition unit configured to acquire a fixed distance value between first audio output means and second audio output means of the second electronic device from the second electronic device before the first position parameter of the first electronic device and the second position parameter of the second electronic device are acquired.

Alternatively, the first acquisition unit further includes: a fifth acquisition sub-unit configured to acquire the second position parameter from the second electronic device, the second position parameter including a first time when the first audio output means outputs first audio information and a second time when the second audio output means outputs second audio information which are determined by the second electronic device; a sixth acquisition sub-unit configured to detect to acquire the first position parameter of the first electronic device after the first time and the second time, the first position parameter including a third time when first audio reception means of the first electronic device receives the first audio information and a fourth time when the first audio reception means receives the second audio information.

Alternatively, the first electronic device further includes: a sixth acquisition unit configured to acquire a second distance value between the first audio output means and the first audio reception means based on the first time and the third time after the first position parameter of the first electronic device and the second position parameter of the second electronic device are acquired; a seventh acquisition unit configured to acquire a third distance value between the second audio output means and the first audio reception means based on the second time and the fourth time after the first position parameter of the first electronic device and the second position parameter of the second electronic device are acquired; and an eighth acquisition unit configured to acquire a first angle of the second electronic device relative to the first electronic device based on the second distance value, the third distance value and the fixed distance value after the first position parameter of the first electronic device and the second position parameter of the second electronic device are acquired.

Alternatively, the first judgment unit further includes: a seventh judgment sub-unit configured to judge whether the second distance value and the third distance value are within a preset distance range, to acquire a sixth judgment result; and an eight judgment sub-unit configured to judge whether the first angle is within a preset angle range to acquire the first judgment result when the sixth judgment result is YES.

One or more technical solutions according to the embodiments of the present application at least include the following technical effects or advantages.

1. In the present application, the first position parameter of the first electronic device and the second position parameter of the second electronic device are acquired by detection; when it is judged that the relative position relationship between the first electronic device and the second electronic device meets a preset condition, the first electronic device establishes a communication connection with the second electronic device and acquires data of a first part of a first object needed to be displayed on the first display unit; a first application program corresponding to the first object is synchronously executed in the second electronic device; and the data of the first part is displayed on the first display unit while data of a second part in the first object different from the data of the first part is displayed on the second display unit. Thus, the present application controls two electronic devices to be spliced together automatically for display of the first object, i.e., output content of an application program, displayed on the first display unit by judging whether the relative position relationship between the two electronic devices meets a preset condition, so as to achieve executing the same program on the two electronic devices. Therefore, the electronic device in the present application effectively solves the technical problem that when two electronic devices are placed together, they cannot be spliced together automatically for display of output content of an application program, so as to achieve executing the same program on the two electronic devices, and achieves the technical effect of splicing two electronic devices together automatically for display of output content of an application program when they are placed together, so as to achieve executing the same program on the two electronic devices.

2. The present application controls two electronic devices to be spliced together automatically for display of the first object, i.e., output content of an application program, displayed on the first display unit by judging whether the relative position relationship between the two electronic devices meets a preset condition, so as to achieve executing the same program on the two electronic devices. Therefore, a user only needs to place the two electronic devices together in use, simplifying the operation and enhancing user experience.

Further, the embodiments of the present application provide an information processing method applied in a first electronic device including a first display unit. When a first part of a object is displayed on the first display unit and a second part of the object is displayed on a second display unit of a second electronic device, the method includes: acquiring a first display parameter of the first display unit and a second display parameter of the second display unit at a first time; judging whether the first display parameter is consistent with the second display parameter; and if the first display parameter is inconsistent with the second display parameter, adjusting at least one of the first display unit, the second display unit, the first part or the second part at a second time after the first time, so that a third display parameter when the first part is displayed on the first display unit is consistent with a fourth display parameter when the second part is displayed on the second display unit.

Alternatively, the first display parameter corresponds to the second display parameter, the third parameter corresponds to the fourth parameter, and each of these display parameters is one of a display size, a resolution, brightness and aberration, or any combination thereof.

Alternatively, when a first display size of the first display unit is inconsistent with a second display size of the second display unit, adjusting at least one of the first display unit, the second display unit, the first part or the second part includes: adjusting the first display size and/or the second display size, so that the adjusted first display size is consistent with the adjusted second display size; or adjusting a display size of the first part and/or a display size of the second part, so that the adjusted display size of the first part is consistent with the adjusted display size of the second part.

Alternatively, when a first resolution of the first display unit is inconsistent with a second resolution of the second display unit, adjusting at least one of the first display unit, the second display unit, the first part or the second part includes: adjusting the first resolution and/or the second resolution, so that the adjusted first resolution is consistent with the adjusted second resolution; or adjusting a resolution of the first part and/or a resolution of the second part, so that the adjusted resolution of the first part is consistent with the adjusted resolution of the second part.

Alternatively, when the first display size of the first display unit is inconsistent with the second display size of the second display unit and the first resolution of the first display unit is inconsistent with the second resolution of the second display unit, adjusting the first display unit, the second display unit, the first part and the second part includes: adjusting the first resolution and/or the second resolution and adjusting the first display size and/or the second display size, so that the adjusted first resolution is consistent with the adjusted second resolution and the adjusted first display size is consistent with the adjusted second display size; or adjusting the resolution of the first part and/or the resolution of the second and adjusting the display size of the first part and/or the display size of the second part, so that the adjusted resolution of the first part is consistent with the adjusted resolution of the second part and the adjusted display size of the first part is consistent with the adjusted display size of the second part.

Alternatively, displaying a first part of an object on the first display unit and displaying a second part of the object on a second display unit of a second electronic device further includes: acquiring first display content corresponding to an application when the application is executed in the first electronic device and/or the second electronic device, the first display content being a part of the display content corresponding to the application; enabling the first display content to be displayed on the first display unit; wherein, the display content is displayed collectively on the first display unit and the second display unit, and each of the first display unit and the second display unit displays a part of the display content.

The embodiments of the present application further provide an electronic device including: a first display unit; an acquisition unit configured to acquire a first display parameter of the first display unit and a second display parameter of the second display unit at a first time when the first part of the object is displayed on the first display unit and the second part of the object is displayed on the second display unit of the second electronic device; a judgment unit configured to judge whether the first display parameter is consistent with the second display parameter; and a processing unit configured to adjust at least one of the first display unit, the second display unit, the first part or the second part at a second time after the first time when a judgment result of the judgment unit is NO, so that a third display parameter when the first part is displayed on the first display unit is consistent with a fourth display parameter when the second part is displayed on the second display unit.

Alternatively, the first display parameter corresponds to the second display parameter, the third parameter corresponds to the fourth parameter, and each of these display parameters is one of a display size, a resolution, brightness and aberration, or any combination thereof.

Alternatively, when a first display size of the first display unit is inconsistent with a second display size of the second display unit, the processing unit is further configured to: adjust the first display size and/or the second display size, so that the adjusted first display size is consistent with the adjusted second display size; or adjust a display size of the first part and/or a display size of the second part, so that the adjusted display size of the first part is consistent with the adjusted display size of the second part.

Alternatively, when a first resolution of the first display unit is inconsistent with a second resolution of the second display unit, the processing unit is further configured to: adjust the first resolution and/or the second resolution, so that the adjusted first resolution is consistent with the adjusted second resolution; or adjust a resolution of the first part and/or a resolution of the second part, so that the adjusted resolution of the first part is consistent with the adjusted resolution of the second part.

Alternatively, when the first display size of the first display unit is inconsistent with the second display size of the second display unit and the first resolution of the first display unit is inconsistent with the second resolution of the second display unit, the processing unit is further configured to adjust the first resolution and/or the second resolution and the first display size and/or the second display size, so that the adjusted first resolution is consistent with the second resolution and the adjusted first display size is consistent with the adjusted second display size; or adjust the resolution of the first part and/or the resolution of the second part and the display size of the first part and/or the display size of the second part, so that the adjusted resolution of the first part is consistent with the adjusted resolution of the second part and the adjusted display size of the first part is consistent with the adjusted display size of the second part.

Alternatively, the processing unit is further configured to acquire first display content corresponding to an application when the application is running in the first electronic device and/or the second electronic device, the first display content being a part of the display content corresponding to the application; and enable the first display content to be displayed on the first display unit; wherein, the display content is displayed collectively on the first display unit and the second display unit, and each of the first display unit and the second display unit displays a part of the display content.

One or more technical solutions according to the embodiments of the present disclosure at least include the following technical effects or advantages.

In an embodiment of the disclosure, a first display parameter of the first display unit and a second display parameter of the second display unit are acquired at a first time; it is judged whether the first display parameter is consistent with the second display parameter; and if the first display parameter is inconsistent with the second display parameter, at least one of the first display unit, the second display unit, the first part or the second part is adjusted at a second time after the first time, so that a third display parameter when the first part is displayed on the first display unit is consistent with a fourth display parameter when the second part is displayed on the second display unit.

It can be seen that, with the method according to the present embodiment, the electronic device adjusts at least one of the first display unit, the second display unit, the first part or the second part, so that a third display parameter when the first part is displayed on the first display unit is consistent with a fourth display parameter when the second part is displayed on the second display unit. This effectively solves the technical problem that when a virtual platform comprised of multiple platforms is used, different display parameters of display units of the multiple platforms result in inconsistent image display parameters, and achieves the technical effect that when a virtual platform comprised of the multiple platforms is used, the image display parameters are consistent even if the display parameters of display units of the multiple platforms are different.

Further, the display parameters of the display units of the multiple platforms are adjusted to make the image display parameters consistent. Therefore, it enables a user to clearly view a display image of the display screen and get a better experience.

DETAILED DESCRIPTION OF THE PREFERRED EMBODIMENTS

Figure 1:
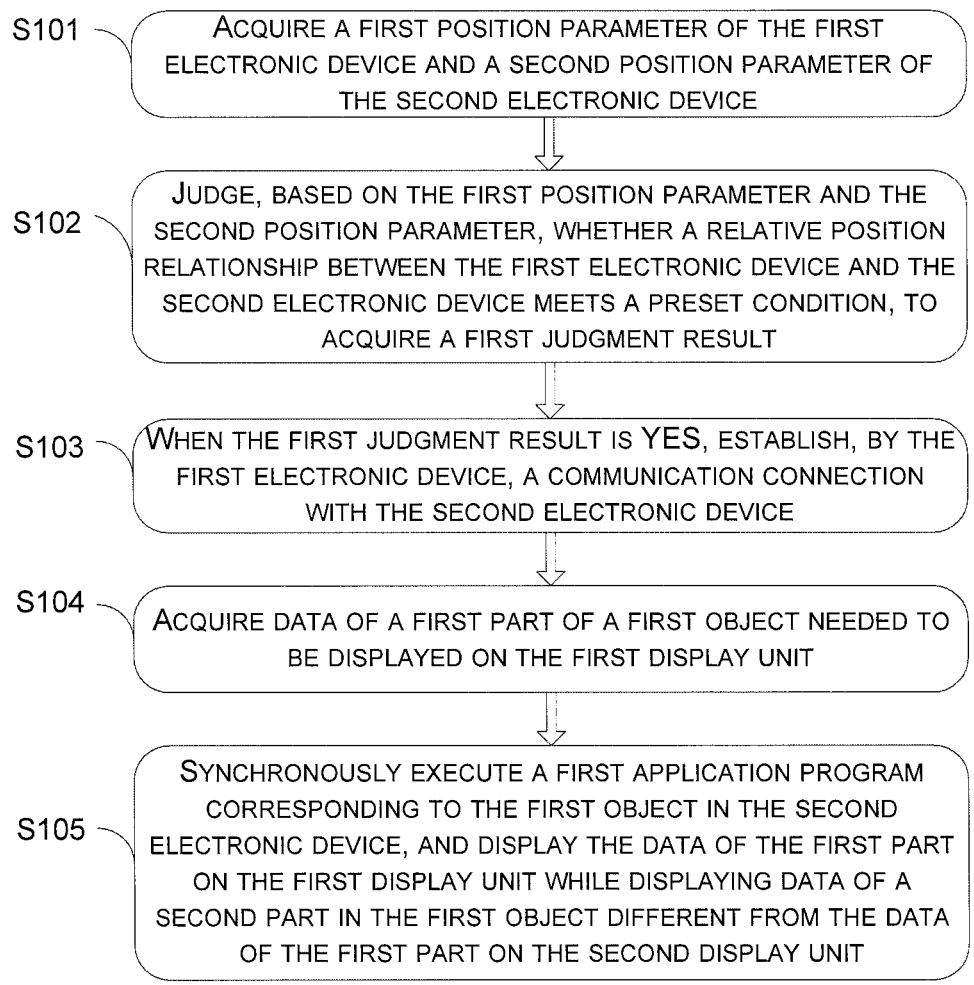
FIG. 1 is a schematic flowchart of a primary information processing method according to a first embodiment of the present application.

Embodiments of the present application provide information processing methods and electronic devices, solving the technical problem that when two electronic devices are placed together, they cannot be spliced together automatically for display of output content of an application program, so as to achieve executing the same program on the two electronic devices.

In order to solve the above technical problem, the general concept of the technical solutions according to the embodiments of the present application is as follows.

A first electronic device controls two electronic devices to be spliced together automatically for display of a first object being displayed on a first display unit, i.e., output content of an application program by judging whether a relative position relationship between the two electronic devices meets a preset condition, so as to achieve executing the same program on the two electronic devices. Therefore, the electronic device in the present application effectively solves the technical problem that when two electronic devices are placed together, they cannot be spliced together automatically for display of output content of an application program, so as to achieve executing the same program on the two electronic devices, and achieves the technical effect of splicing two electronic devices together automatically for display of output content of an application program when they are placed together, so as to achieve executing the same program on the two electronic devices.

The technical solutions of the disclosure will be described in detail below in conjunction with accompanying drawings and specific embodiments. It should be understood that, the embodiments of the present application and the specific features in the embodiments are indented to specifically describe the technical solutions of the disclosure, instead of limiting the technical solutions of the disclosure. The embodiments of the present application and the technical features in the embodiments can be combined with each other without conflict.

The embodiments of the present application provide information processing methods and electronic devices. In a specific implementation, the electronic devices may be a smart phone with a display unit, or a tablet computer or a notebook computer, which will not be limited by the embodiments of the present application. Further, in a specific implementation, two electronic devices may cooperate to display output content of a first application program when the first application program is running, or four electronic devices may be placed together for example in a " 冊 " shape to display the output content. A specific number of the electronic devices also will not be limited in the present application. The information processing methods and electronic devices according to the embodiments of the present application will be described in detail below by taking cooperation between two tablet computers for display as an example.

First Embodiment

With reference to FIG. 1, the embodiment of the present application provides an information processing method applied in a first electronic device. The first electronic device includes a first display unit and is capable of communicating with a second electronic device including a second display unit. The method includes:

Step S101: acquiring a first position parameter of the first electronic device and a second position parameter of the second electronic device.

Step S102: judging, based on the first position parameter and the second position parameter, whether a relative position relationship between the first electronic device and the second electronic device meets a preset condition, to acquire a first judgment result.

Step S103: when the first judgment result is YES, establishing, by the first electronic device, a communication connection with the second electronic device;

Step S104: acquiring data of a first part of a first object needed to be displayed on the first display unit; and Step S105: synchronously executing a first application program corresponding to the first object in the second electronic device, and displaying the data of the first part on the first display unit while displaying data of a second part in the first object different from the data of the first part on the second display unit.

In the embodiment of the present application, before the first application program, such as a picture view program or a webpage browser, is executed in the two electronic devices, and output content of the first application program when the first application program is running is displayed collectively on the two electronic devices, it needs to judge whether a relative position between the two electronic devices meets a splicing condition by performing steps S101 and S102.

In a specific implementation, steps S101 and S102 may be performed in many schemes. In the embodiment of the present application, the implementation of steps S101 and S102 will be described by taking the following three schemes as an example.

First Scheme

Before step S101, the method further includes:

First step: establishing, by the first electronic device, a connection with the second electronic device.

In a specific implementation, a communication channel is firstly established between the first electronic device and the second electronic device.

In a specific implementation, when it needs to enable a first application program to be executed collectively in the first electronic device and the second electronic device, the first electronic device will firstly establish a communication connection with the second electronic device, so as to implement the subsequent synchronization process. Further, a time channel is set in the connection channel, so as to synchronize a first timeline module with a second timeline module.

Specifically, the communication connection between the first electronic device and the second electronic device may be implemented via a data line, so as to implement communication between the first electronic device and the second electronic device. Further, in order to facilitate a user in implementing the communication connection between the two electronic devices, the communication connection between the first electronic device and the second electronic device may also be implemented via a wireless WIFI network, Bluetooth, or infrared. The specific manner of communication connection may be set by those skilled in the art according to practical requirements, and is not limited in the present application.

Second step: synchronizing the first electronic device with the second electronic device through a first timeline module in the first electronic device and a second timeline module in the second electronic device.

In the embodiment of the present application, assuming that time of the first timeline module in the first electronic device is taken as a reference, the time of the first timeline module is transmitted to the second electronic device. After the second electronic device receives the time of the first timeline module, the second electronic device compares the time of the first timeline module with the time of the second timeline module of its own to acquire a device time difference value. Thus, synchronization between the first timeline module and the second timeline module is implemented, and thereby, synchronization between the first electronic device and the second electronic device is implemented.

Specifically, if the time of the first timeline module is the same as the time of the second timeline module, the acquired device time difference value is 0, and if the time of the first timeline module is different from the time of the second timeline module, the acquired device time difference value is nonzero. Further, the accuracy of the device time difference value can be on the order of s or ms, for example, the device time difference value may be 1 s or 20 ms.

Further, if the time of the first timeline module, for example t1 such as 14:50:35, is different from the time of the second timeline module, for example t2 such as 14:50:36, the acquired device time difference value is t2−t1, which is equal to 1 s.

As another example, if the time t1 of the first timeline module is 14:50:35 and the time t2 of the second timeline module is 14:50:33, the acquired device time difference value is t2−t1, which is equal to −2 s. That is, the time of the second timeline module is later than the time of the first timeline module.

In the embodiment of the present application, after the device time difference is acquired, step S101 of acquiring a first position parameter of the first electronic device and a second position parameter of the second electronic device is performed.

Figure 2:
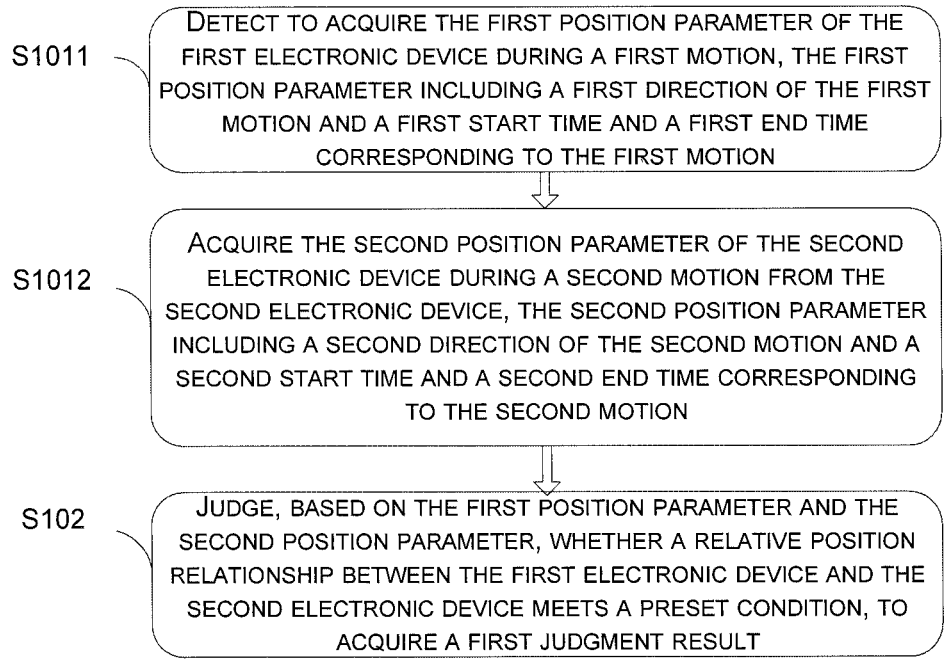
FIG. 2 is a schematic flowchart of an information processing method of a first scheme according to the first embodiment of the present application.

With reference to FIG. 2, in a specific implementation, step S101 includes:

S1011: detecting to acquire the first position parameter of the first electronic device during a first motion, the first position parameter including a first direction of the first motion and a first start time and a first end time corresponding to the first motion;

S1012: acquiring the second position parameter of the second electronic device during a second motion from the second electronic device, the second position parameter including a second direction of the second motion and a second start time and a second end time corresponding to the second motion.

In the embodiment of the present application, a sensor for detecting a direction of a motion of the first electronic device and a sensor for detecting a direction of a motion of the second electronic device may be installed in the first electronic device and the second electronic device respectively. The sensor may be a gravity sensor, a direction sensor, or a gyroscope sensor. The embodiment of the present application will be described by taking a direction sensor as an example.

Specifically, a first direction sensor is arranged in the first electronic device, and a second direction sensor is arranged in the second electronic device. The first direction sensor may detect that the first motion of the first electronic device is in a horizontal rightward direction, or in an upper-left direction with an angle of 25° from the horizontal plane.

Meanwhile, the first electronic device acquires a first start time t3 corresponding to the first motion, i.e., the time when the first electronic device starts the motion, and a first end time t4, i.e., the time when the first electronic device terminates the motion, and stores the first start time t3 and the first end time t4 in a memory of the first electronic device.

Similarly, the second direction sensor arranged in the second electronic device detects in the same manner to acquire a second direction of a second motion of the second electronic device, a second start time t5 and a second end time t6, and transmits the data to the first electronic device. The first electronic device receives the data from the second electronic device and stores the data in the memory of the first electronic device.

After step S101, in order to acquire a relative distance between the first electronic device and the second electronic device after both the first electronic device and the second electronic device are stopped, it is detected to acquire a first distance value between the first electronic device and the second electronic device at a third time after the first end time and the second end time.

In the embodiment of the present application, a distance between the first electronic device and the second electronic device is calculated by a distance sensor in the first electronic device transmitting a very short light pulse and measuring a time interval from the time when the light pulse is transmitted to the time when the light pulse is reflected back from the second electronic device. For example, the first distance value between the first electronic device and the second electronic device may be 0.1 cm or 1 cm.

Next, in order to judge whether the relative position relationship between the two electronic devices meets a preset condition, step S102 of judging, based on the first position parameter and the second position parameter, whether a relative position relationship between the first electronic device and the second electronic device meets a preset condition to acquire a first judgment result is performed.

In order to clearly describe a specific process of judging whether the relative position relationship between the first electronic device and the second electronic device meets a preset condition to acquire a first judgment result, the present embodiment will be described specifically in the following three cases.

First Case

First step: judging whether the first direction is opposite to the second direction, to acquire a second judgment result. This is because when two electronic devices need to be spliced, in order to make the view effect for the user better, it needs to make the two electronic devices close to each other, i.e., the motions of the two electronic devices are in opposite directions.

Specifically, the second judgment result may be that the first direction is opposite to the second direction, or the first direction is not opposite to the second direction.

For example, when the first motion of the first electronic device is in a horizontal rightward direction and the second motion of the second electronic device is in a horizontal leftward direction, the first direction is opposite to the second direction; or when the first motion of the first electronic device is in a horizontal leftward direction and the second motion of the second electronic device is in a straight downward direction, the first direction is not opposite to the second direction.

Second step: when the second judgment result indicates that the first direction is opposite to the second direction, judging whether the first time difference value between the first start time and the second start time is equal to the device time difference value, to acquire a third judgment result.

Specifically, taking the above time difference value of 1 s as an example as well, firstly, a first time difference value t5−t3 between the first start time t3 and the second start time t5 acquired in steps S1011 and S1012 is acquired based on the first start time t3 and the second start time t5. If the first start time is 14:50:35, the second start time is 14:50:36 and the time of the first timeline module in the first electronic device is still taken as a reference, the first time difference value is t5−t3, which is equal to 1 s. Thus, the first time difference value is equal to the device time difference value.

Third step: in order to make the view effect for the user better, it needs to make the two electronic devices close to each other. Therefore, when the third judgment result indicates that the first time difference value is equal to the device time difference value, it is judged whether the first distance value is smaller than a preset distance value, to acquire the first judgment result.

In the embodiment of the present application, the specific preset distance value may be set according to sizes of touch-sensitive display screens of the electronic devices. For example, when each of the sizes of the touch-sensitive display screens is larger than or equal to 7 inches, the preset distance value may be set to 0.4 cm, and when each of the sizes of the touch-sensitive display screens is smaller than 4 inches, the preset distance value may be set to 0.15 cm.

Specifically, taking the above first distance value of 0.1 cm as an example as well, if each of the sizes of display units of the first electronic device and the second electronic device is 4.3 inches and the preset distance value is 0.12 cm, it is judged that the first distance value of 0.1 cm is smaller than the preset distance value 0.12 cm. Thus, the first judgment result indicates that the relative position relationship between the first electronic device and the second electronic device meets the preset condition.

Second Case

For convenience of user operation, in the embodiment of the present application, a preset condition in the second case may be that the two electronic devices start the motions simultaneously, that is, the first time difference value between the first start time and the second start time is equal to the device time difference value, and the preset condition in the second case may also be that the two electronic devices stop the motions simultaneously, that is, the second time difference value between the first end time and the second end time is equal to the device time difference value.

At this time, judging whether a relative position relationship between the first electronic device and the second electronic device meets a preset condition to acquire a first judgment result further includes the following three steps.

First step: judging whether the first direction is opposite to the second direction, to acquire a second judgment result. The specific process can be learned with reference to the first step under the first case.

Step two: when the second judgment result indicates that the first direction is opposite to the second direction, judging whether a second time difference value between the first end time and the second end time is equal to the device time difference value, to acquire a fourth judgment result.

Specifically, taking the above time difference value of 1 s as an example as well, firstly, a second time difference value t6−t4 between the first end time t4 and the second end time t6 acquired in steps S1011 and S1012 is acquired based on the first end time t4 and the second end time t6. If the first end time is 14:50:39, the second end time is 14:50:40 and the time of the first timeline module in the first electronic device is still taken as a reference, the second time difference value is t6−t4, which is equal to 1 s. Thus, the second time difference value is equal to the device time difference value.

Third step: judging whether the first distance value is smaller than a preset distance value, to acquire the first judgment result. The specific process can be learned with reference to the third step under the first case.

Third Case

In order to make the judgment of the relative position relationship between the electronic devices more accurate, a preset condition in the third case may be that the two electronic devices not only start the motions simultaneously but also stop the motions simultaneously. That is, not only the first time difference value between the first start time and the second start time is equal to the device time difference value but also the second time difference value between the first end time and the second end time is equal to the device time difference value. At this time, judging whether a relative position relationship between the first electronic device and the second electronic device meets a preset condition to acquire a first judgment result further includes the following four steps.

First step: judging whether the first direction is opposite to the second direction, to acquire a second judgment result. The specific process can be learned with reference to the first step under the first case.

Second step: when the second judgment result indicates that the first direction is opposite to the second direction, judging whether the first time difference value between the first start time and the second start time is equal to the device time difference value, to acquire a third judgment result. The specific process can be learned with reference to the second step under the first case.

Third step: when the third judgment result indicates that the first time difference value between the first start time and the second start time is equal to the device time difference value, judging whether the second time difference value between the first end time and the second end time is equal to the device time difference value, to acquire a fifth judgment result. The specific process can be learned with reference to the second step under the second case.

Fourth step: judging whether the first distance value is smaller than a preset distance value, to acquire the first judgment result. The specific process can be learned with reference to the third step under the first case.

According to the above three cases, those ordinary skilled in the art can clearly appreciate specific implementations of judging, under different preset conditions, whether a relative position relationship between the first electronic device and the second electronic device meets a particular preset condition. The implementations of judging, under a preset condition except for the preset conditions in the above three cases, whether a relative position relationship between the first electronic device and the second electronic device meets the preset condition will be omitted here.

In the method of the present application, the preset condition may specifically be a default setting when the electronic device leaves the factory, or a personalized preset condition defined by combining use habits of a user and definition terms provided by the electronic device.

In the embodiment of the present application, in order to make the operation of splicing the two electronic devices more convenient and fast, steps S101 and S102 may also be performed in a second scheme.

In a specific implementation, a first trigger sensor and a second trigger sensor are arranged in the two electronic devices respectively. In the embodiment of the present application, each of the first trigger sensor and the second trigger sensor is an inductive sensor.

Further, when multiple electronic devices are spliced, display units, i.e., display screens of the multiple electronic devices are to be spliced side by side. Therefore, the first trigger sensor and the second trigger sensor may be arranged on the sides of the two electronic devices respectively, for example, on the left side or the upper side.

In the embodiment of the present application, two electronic devices are taken as an example, and the first trigger sensor is arranged on the right side of the first electronic device, and the second trigger sensor is arranged on the left side of the second electronic device.

Figure 3:
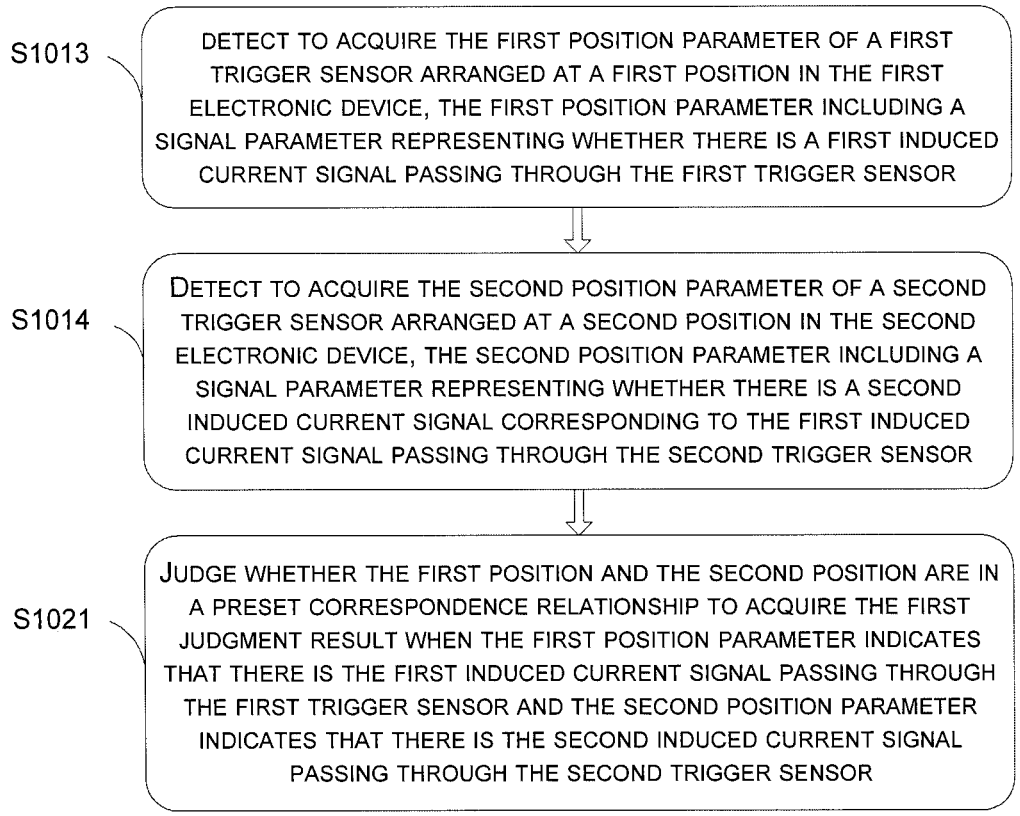
FIG. 3 is a schematic flowchart of an information processing method of a second scheme according to the first embodiment of the present application.

With reference to FIG. 3, in the second scheme, step S101 of acquiring a first position parameter of the first electronic device and a second position parameter of the second electronic device further includes the following two steps.

Step S1013: detecting to acquire the first position parameter of a first trigger sensor arranged at a first position in the first electronic device, the first position parameter including a signal parameter representing whether there is a first induced current signal passing through the first trigger sensor.

Step S1014: detecting to acquire the second position parameter of a second trigger sensor arranged at a second position in the second electronic device, the second position parameter including a signal parameter representing whether there is a second induced current signal corresponding to the first induced current signal passing through the second trigger sensor.

Specifically, the inductive sensor includes a Radio Frequency (RF) coil. If the first trigger sensor is arranged on the right side of the first electronic device, a second trigger sensor is arranged on the left side of the second electronic device, and the second electronic device is on the right side of the first electronic device and is close enough to the first electronic device, so that the second trigger sensor is close enough to the first trigger sensor. When a current in the RF coil of the first trigger sensor changes, it will induce a change of a magnetic flux in the RF coil of the second trigger sensor, resulting in a second induced current in the RF coil of the second trigger sensor. Similarly, the second included current will induce a change of a magnetic flux in the RF coil of the first trigger sensor, resulting in a first induced current in the RF coil of the first trigger sensor.

In the embodiment of the present application, when the first position parameter indicates that there is the first induced current signal passing through the first trigger sensor and the second position parameter indicates that there is the second induced current signal passing through the second trigger sensor, it is judged whether the first position and the second position are in a preset correspondence relationship, to acquire the first judgment result.

In a specific implementation, if the second electronic device is on the right side of the first electronic device and is close enough to the first electronic device so that the second trigger sensor is close enough to the first trigger sensor and there is a change of current in the RF coil of the first trigger sensor of the first electronic device, the second electronic device will firstly detect a signal parameter representing that there is a second induced current signal passing through the second trigger sensor.

Specifically, the signal parameter representing that there is a second induced current signal passing through the second trigger sensor may be an intensity of the second induced current and/or a direction of the second induced current. Then, the first electronic device will detect a signal parameter representing that there is a first induced current signal passing through the RF coil of the first trigger sensor. Similarly, the signal parameter representing that there is a first induced current signal passing through the first trigger sensor may be an intensity of the first induced current and/or a direction of the first induced current.

In a specific implementation, after the second electronic device detects the signal parameter representing that there is a second induced current signal passing through the second trigger sensor, the second electronic device will transmit the above signal parameter to the first electronic device.

Next, the first electronic device performs step S102 of judging, based on the first position parameter and the second position parameter, whether a relative position relationship between the first electronic device and the second electronic device meets a preset condition, to acquire a first judgment result.

In the second scheme, step S102 further includes step S1021 of judging whether the first position and the second position are in a preset correspondence relationship to acquire the first judgment result when the first position parameter indicates that there is the first induced current signal passing through the first trigger sensor and the second position parameter indicates that there is the second induced current signal passing through the second trigger sensor.

In the embodiment of the present application, there may be multiple groups of trigger sensors in the first electronic device and the second electronic device respectively. For example, there may be trigger sensors on the left side, the right side and the back side of the first electronic device respectively and there may also be trigger sensors on the left side, the right side and the back side of the second electronic device respectively. Further, if a correspondence relationship is that the trigger sensor on the right side of the first electronic device and the trigger sensor on the left side of the second electronic device trigger each other, a splicing operation is performed on the two electronic devices. If the trigger sensor on the right side of the first electronic device and the trigger sensor on the back side of the second electronic device trigger each other when a user places the two electronic devices together, a splicing operation will not be performed on the two electronic devices.

In a specific implementation, the trigger manner may be set according to users' habits. For example, if a user often splices two electronic devices in a left and right relationship for display, the trigger sensor arranged on the right side of the first electronic device and the trigger sensor arranged on the left side of the second electronic device trigger each other, so that the two electronic devices are spliced. Alternatively, if a user often splices two electronic devices in an up and down relationship for display, the trigger sensor arranged on the lower side of the first electronic device and the trigger sensor arranged on the upper side of the second electronic device trigger each other, so that the two electronic devices are spliced. The specific trigger manner will not be limited in the present application.

Third Scheme

In the embodiment of the present application, when there is no means such as a direction sensor or a trigger sensor in the first electronic device and the second electronic device, the electronic device may acquire a relative position relationship between the two electronic devices in a third scheme. That is, the relative position relationship between the two electronic devices is acquired by cooperation between audio output means and audio reception means, and then the two electronic devices are controlled to be spliced according to the acquired relative position relationship.

In the embodiment of the present application, the first electronic device includes audio reception means for receiving audio information, and the second electronic device includes two audio output means, which are first audio output means and second audio output means respectively.

In a specific implementation, before step S101, the method further includes the following steps.

First step: establishing, by the first electronic device, a connection with the second electronic device.

Second step: synchronizing the first electronic device with the second electronic device through a first timeline module in the first electronic device and a second timeline module in the second electronic device.

The specific process of the above two steps can be learned with reference to the corresponding description in the first scheme.

Third step: acquiring a fixed distance value between the first audio output means and the second audio output means of the second electronic device from the second electronic device.

Specifically, the second electronic device acquires the fixed distance value between the first audio output means and the second audio output means by detecting information such as a model, a configuration parameter etc. of its own. For example, the fixed distance value may be 0.05 cm or 0.12 cm, which is not limited in the present application.

Figure 4:
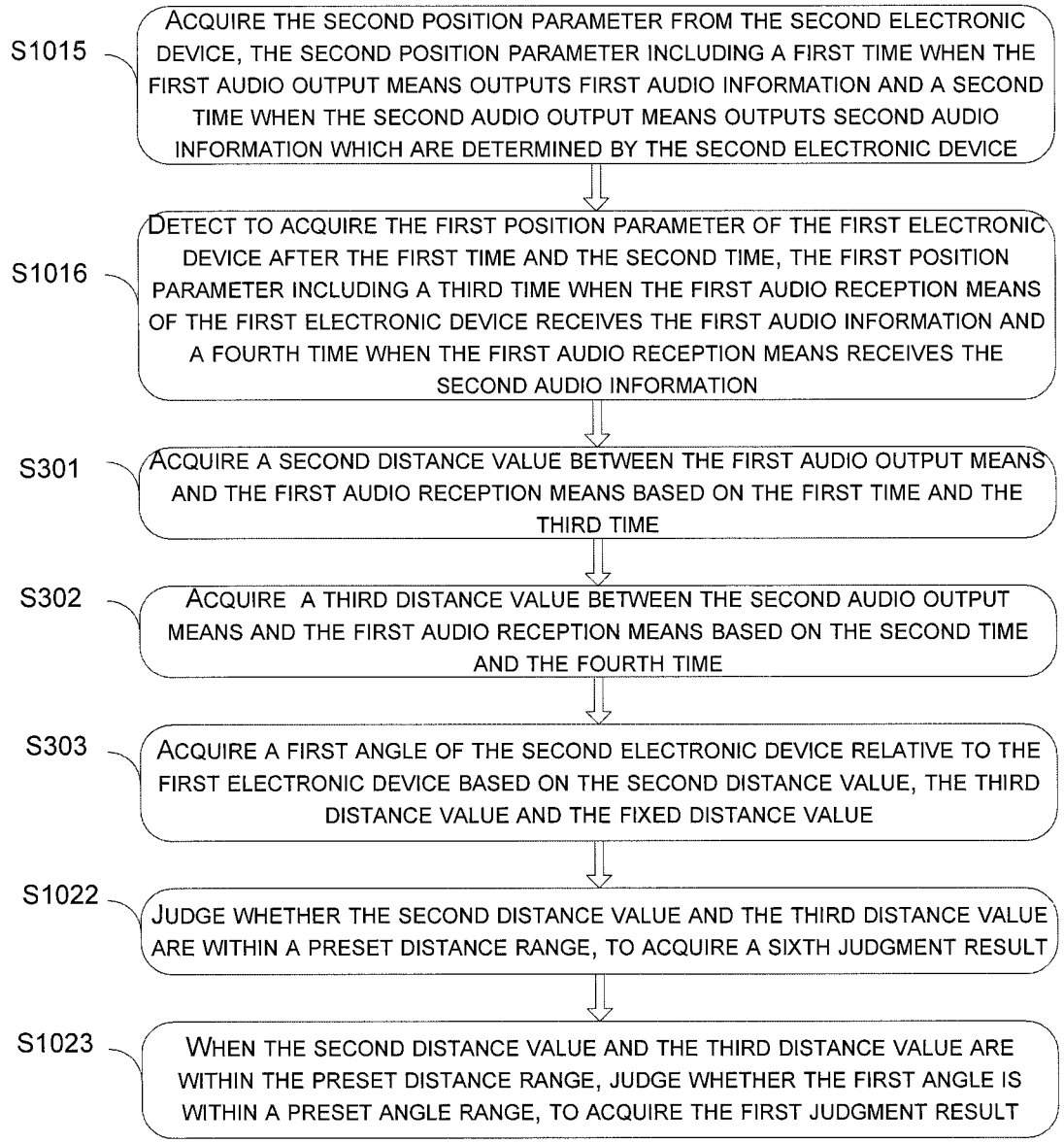
FIG. 4 is a schematic flowchart of an information processing method of a third scheme according to the first embodiment of the present application.

Next, the first electronic device performs step S101 of acquiring a first position parameter of the first electronic device and a second position parameter of the second electronic device. With reference to FIG. 4, step S101 further includes the following two steps.

Step S1015: acquiring the second position parameter from the second electronic device, the second position parameter including a first time when the first audio output means outputs first audio information and a second time when the second audio output means outputs second audio information which are determined by the second electronic device.

Step S1016: detecting to acquire the first position parameter of the first electronic device after the first time and the second time, the first position parameter including a third time when the first audio reception means of the first electronic device receives the first audio information and a fourth time when the first audio reception means receives the second audio information.

In the embodiment of the present application, after step S101, the method further includes the following steps.

Step S301: acquiring a second distance value between the first audio output means and the first audio reception means based on the first time and the third time;

Step S302: acquiring a third distance value between the second audio output means and the first audio reception means based on the second time and the fourth time; and Step S303: acquiring a first angle of the second electronic device relative to the first electronic device based on the second distance value, the third distance value and the fixed distance value.

In the embodiment of the present application, if the acquired second distance value is 0.1 cm, the acquired third distance value is 0.15 cm, and the acquired second distance value, the acquired third distance value and the above acquired fixed distance value are length values of three sides capable of constituting a triangle, any angle of the above triangle can be acquired according to the cosine law. Thereby, the first angle of the second electronic device relative to the first electronic device can be acquired. Specifically, the first angle may be 30° or 45°.

In the embodiment of the present application, after acquiring the above second distance value, the third distance value and the first angle, step S102 of judging, based on the first position parameter and the second position parameter, whether a relative position relationship between the first electronic device and the second electronic device meets a preset condition to acquire a first judgment result is performed. Step S102 further includes the following steps.

Step S1022: judging whether the second distance value and the third distance value are within a preset distance range, to acquire a sixth judgment result.

Specifically, if the acquired second distance value is 0.1 cm and the acquired third distance value is 0.15 cm, the preset distance range may be set according to sizes of the touch-sensitive display screens of the electronic devices in the embodiment of the present application. For example, when each of the sizes of the touch-sensitive display screens is larger than or equal to 7 inches, the preset distance range may be from 0 cm to 0.3 cm, and when each of the sizes of the touch-sensitive display screens is smaller than 4 inches, the preset distance range may be from 0 cm to 0.15 cm.

If the preset distance range is from 0 cm to 0.15 cm, the second distance value is 0.1 cm and the third distance value is 0.15 cm, the second distance value and the third distance value are within the preset distance range.

Step S1023: when the second distance value and the third distance value are within the preset distance range, judging whether the first angle is within a preset angle range, to acquire the first judgment result.

In the embodiment of the present application, the specific preset distance range may be set according to positions of the audio output means and the audio reception means of the electronic devices. For example, when sizes of the two electronic devices are the same and both the audio output means and the audio reception means of the two electronic devices are arranged on the sides thereof, the preset angle range is from 0° to 10°. Alternatively, when the sizes of the two electronic devices are the same and the audio output means of the second electronic device is arranged on the lower side thereof and the audio reception means of the first electronic device is arranged on the side thereof, the preset angle range is from 40° to 55°. The specific preset angle range is not limited in the present application.

Specifically, if the preset angle range is from 0° to 10° and the acquired first angle is 4.5°, the first angle is within the preset angle range.

In the embodiment of the present application, after step S102, in order to splice the two electronic devices, step S103 of establishing, by the first electronic device, a communication connection with the second electronic device when the first judgment result is YES is performed.

Specifically, the communication connection between the first electronic device and the second electronic device may be implemented via a data line, so as to implement communication between the first electronic device and the second electronic device. Further, in order to facilitate a user in implementing the communication connection between the two electronic devices, the communication connection between the first electronic device and the second electronic device may also be implemented via a wireless WIFI network, Bluetooth, or infrared. The specific manner of communication connection may be set by those skilled in the art according to practical requirements. In addition, in order to reduce the operation steps and enhance the operational efficiency of the electronic devices, the communication connection in step S103 may be the same as the communication connection for synchronizing the first electronic device with the second electronic device before step S101, which is not limited in the present application.

After the communication connection is established between the first electronic device and the second electronic device, the method further includes step S104 of acquiring data of a first part of a first object needed to be displayed on the first display unit.

Specifically, in the embodiment of the present application, the following implementation of two electronic devices negotiating to determine content needed to be displayed on the first display unit and the second display unit respectively corresponds to step S104 of acquiring data of a first part of a first object needed to be displayed on the first display unit and data of a second part of the first object needed to be displayed on the second display unit in the method according to the embodiment of the present application.

Specifically, in the embodiment of the present application, after a communication connection is established between the first electronic device and the second electronic device, the first electronic device negotiates with the second electronic device to determine content needed to be displayed on the first display unit and the second display unit respectively. The specific steps are as follows.

First step: acquiring a position of the first electronic device relative to the second electronic device.

Specifically, since the position of the first electronic device relative to the second electronic device is different, the content displayed on the first display unit and the second display unit will also be different. Therefore, it needs to firstly acquire the position of the first electronic device relative to the second electronic device. For example, when the first electronic device is placed on the left side of the second electronic device, the first display unit needs to display a left half of a first object, and the second electronic device needs to display a right half of the first object; and when the first electronic device is placed on the lower side of the second electronic device, the first display unit needs to display a lower half of a first object, and the second electronic device needs to display an upper half of the first object.

Second step: determining data of the first part needed to be displayed on the first display unit and data of the second part needed to be displayed on the second display unit according to the position of the first electronic device relative to the second electronic device.

Specifically, in the embodiment of the present application, after the position of first electronic device relative to the second electronic device is determined, it further needs to determine content needed to be displayed on the first display unit and the second display unit. For example, if a picture is displayed collectively on two tablet computers with the same parameters, when it is determined that the first tablet computer is placed on the left side of the second tablet computer, the left half of the picture is enabled to be displayed on the first tablet computer, and the right half of the picture is enabled to be displayed on the second tablet computer.

After step S104, in order to display an execution interface of a first application program on the first display unit and the second display unit, it needs to perform step S105 of synchronously executing the first application program corresponding to the first object in the second electronic device, and displaying the data of the first part on the first display unit while displaying data of a second part in the first object different from the data of the first part on the second display unit.

A display process of the first display unit will be described below and further includes the following steps.

First step: receiving, by a first graphics processor in the first electronic device, the data of the first part from a central processing unit in the second electronic device when the first application program is running.

Specifically, when the first application program, for example, a webpage browser is running, the central processing unit of the first electronic device will generate the data of the first part of the first application program displayed on the first display unit, and the first graphical processor in the first electronic device, for example, a graphics card will receive the data of the first part from the central processing unit.

Second step: the graphics processor processing the data of the first part to acquire first output content.

Specifically, after the first graphics processor, for example, the graphics card, receives the data of the first part from the central processing unit, the first graphics processor further processes the data of the first part to acquire data capable of being displayed.

Third step: storing the first output content in a first display memory of the first electronic device.

Fourth step: a first random read-write storage digital-to-analog converter of the first electronic device converting the first output content into first analog content corresponding to the first output content, and transmitting the first analog content to the first display unit for display.

Second Embodiment

Figure 5:
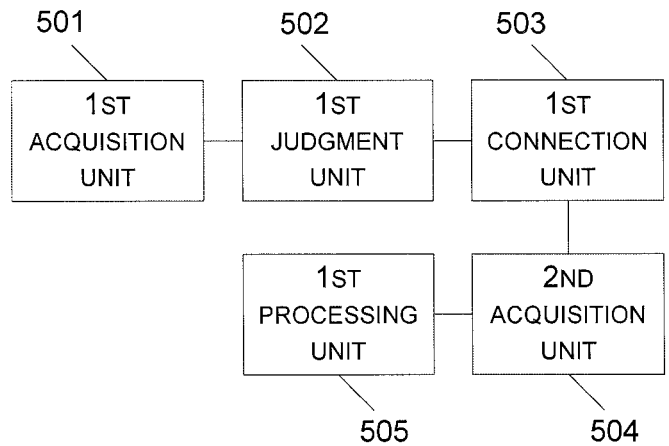
FIG. 5 is structure block diagram of a first electronic device according to a second embodiment of the present application.

With reference to FIG. 5, the embodiment of the present application provides a first electronic device, including a first display unit and being capable of communicating with a second electronic device including a second display unit. The first electronic device includes:

a first acquisition unit 501 configured to acquire a first position parameter of the first electronic device and a second position parameter of the second electronic device;

a first judgment unit 502 configured to judge, based on the first position parameter and the second position parameter, whether a relative position relationship between the first electronic device and the second electronic device meets a preset condition, to acquire a first judgment result;

a first connection unit 503 configured to establish a communication connection between the first electronic device and the second electronic device when the first judgment result is YES;

a second acquisition unit 504 configured to acquire data of a first part of a first object needed to be displayed on the first display unit; and a first processing unit 505 configured to synchronously execute a first application program corresponding to the first object in the second electronic device, and display the data of the first part on the first display unit while displaying data of a second part in the first object different from the data of the first part on the second display unit.

Alternatively, the electronic device may be implemented in many schemes. In the embodiment of the present application, the implementation of the electronic device will be described by taking the following three schemes as an example.

First Scheme

The first electronic device further includes: a first synchronization unit configured to synchronize the first electronic device with the second electronic device before the first position parameter of the first electronic device and the second position parameter of the second electronic device are acquired.

Alternatively, in order to synchronize the first electronic device with the second electronic device, the first synchronization unit further includes: a time synchronization unit configured to synchronize the first electronic device with the second electronic device through a first timeline module in the first electronic device and a second timeline module in the second electronic device.

Alternatively, the first electronic device further includes: a third acquisition unit configured to acquire a device time difference value representing a time difference between the first electronic device and the second electronic device when or after the first electronic device is synchronized with the second electronic device through the first timeline module in the first electronic device and the second timeline module in the second electronic device.

Alternatively, in order to acquire the position parameter information of the first electronic device and the second electronic device, the first acquisition unit further includes: a first acquisition sub-unit configured to detect to acquire the first position parameter of the first electronic device during a first motion, the first position parameter including a first direction of the first motion and a first start time and a first end time corresponding to the first motion; and a second acquisition sub-unit configured to acquire the second position parameter of the second electronic device during a second motion from the second electronic device, the second position parameter including a second direction of the second motion and a second start time and a second end time corresponding to the second motion.

Alternatively, in order to make the relative position relationship between the first electronic device and the second electronic device more accurate, the first electronic device further includes:

a fourth acquisition unit configured to detect to acquire a first distance value between the first electronic device and the second electronic device at a third time after the first end time and the second end time after the first position parameter of the first electronic device and the second position parameter of the second electronic device are acquired.

Alternatively, in order to judge whether the relative position relationship between the first electronic device and the second electronic device meets a preset condition, there are three manners for constituting the first judgment unit based on different preset conditions.

First Manner

The first judgment unit further includes: a second judgment sub-unit configured to judge whether the first direction is opposite to the second direction, to acquire a second judgment result; a third judgment sub-unit configured to judge whether a first time difference value between the first start time and the second start time is equal to the device time difference value to acquire a third judgment result when the second judgment result is YES; a first judgment sub-unit configured to judge whether the first distance value is smaller than a preset distance value to acquire the first judgment result when the third judgment result is YES.

Second Manner

The first judgment unit further includes: a second judgment sub-unit configured to judge whether the first direction is opposite to the second direction, to acquire a second judgment result; a fourth judgment sub-unit configured to judge whether a second time difference value between the first end time and the second end time is equal to the device time difference value to acquire a fourth judgment result when the second judgment result is YES; and a first judgment sub-unit configured to judge whether the first distance value is smaller than a preset distance value to acquire the first judgment result when the fourth judgment result is YES.

Third Manner

The first judgment unit further includes: a second judgment sub-unit configured to judge whether the first direction is opposite to the second direction, to acquire a second judgment result; a third judgment sub-unit configured to judge whether a first time difference value between the first start time and the second start time is equal to the device time difference value, to acquire a third judgment result when the second judgment result is YES; a fifth judgment sub-unit configured to judge whether a second time difference value between the first end time and the second end time is equal to the device time difference value to acquire a fifth judgment result when the third judgment result is YES; a first judgment sub-unit configured to judge whether the first distance value is smaller than a preset distance value to acquire the first judgment result when the fifth judgment result is YES.

Second Scheme

The first acquisition unit further includes: a third acquisition sub-unit configured to detect to acquire the first position parameter of a first trigger sensor arranged at a first position in the first electronic device, the first position parameter including a signal parameter representing whether there is a first induced current signal passing through the first trigger sensor; a fourth acquisition sub-unit configured to detect to acquire the second position parameter of a second trigger sensor arranged at a second position in the second electronic device, the second position parameter including a signal parameter representing whether there is a second induced current signal corresponding to the first induced current signal passing through the second trigger sensor.

Alternatively, in order to judge whether the relative position relationship between the first electronic device and the second electronic device meets a preset condition, the first judgment unit further includes: a sixth judgment sub-unit configured to judge whether the first position and the second position are in a preset correspondence relationship to acquire the first judgment result when the first position parameter indicates that there is the first induced current signal passing through the first trigger sensor and the second position parameter indicates that there is the second induced current signal passing through the second trigger sensor.

Alternatively, each of the first trigger sensor and the second trigger sensor is an inductive sensor.

Third Scheme

The electronic device further includes: a fifth acquisition unit configured to acquire a fixed distance value between first audio output means and second audio output means of the second electronic device from the second electronic device before the first position parameter of the first electronic device and the second position parameter of the second electronic device are acquired.

Alternatively, in order to acquire the position parameters of the first electronic device and the second electronic device, the first acquisition unit further includes: a fifth acquisition sub-unit configured to acquire the second position parameter from the second electronic device, the second position parameter including a first time when the first audio output means outputs first audio information and a second time when the second audio output means outputs second audio information which are determined by the second electronic device; a sixth acquisition sub-unit configured to detect to acquire the first position parameter of the first electronic device after the first time and the second time, the first position parameter including a third time when first audio reception means of the first electronic device receives the first audio information and a fourth time when the first audio reception means receives the second audio information.

Alternatively, in order to acquire the distance value and the angle according to the above time values, the first electronic device further includes: a sixth acquisition unit configured to acquire a second distance value between the first audio output means and the first audio reception means based on the first time and the third time after the first position parameter of the first electronic device and the second position parameter of the second electronic device are acquired; a seventh acquisition unit configured to acquire a third distance value between the second audio output means and the first audio reception means based on the second time and the fourth time after the first position parameter of the first electronic device and the second position parameter of the second electronic device are acquired; and an eighth acquisition unit configured to acquire a first angle of the second electronic device relative to the first electronic device based on the second distance value, the third distance value and the fixed distance value after the first position parameter of the first electronic device and the second position parameter of the second electronic device are acquired.

Alternatively, in order to judge whether the relative position relationship between the first electronic device and the second electronic device meets a preset condition, the first judgment unit further includes: a seventh judgment sub-unit configured to judge whether the second distance value and the third distance value are within a preset distance range, to acquire a sixth judgment result; and an eight judgment sub-unit configured to judge whether the first angle is within a preset angle range to acquire the first judgment result when the sixth judgment result is YES.

The electronic device according to the present embodiment is virtual means corresponding to a method, and therefore, the specific operation process thereof will be omitted.

One or more technical solutions according to the embodiments of the present application at least include the following technical effects or advantages.

1. In the present application, the first position parameter of the first electronic device and the second position parameter of the second electronic device are acquired by detection; when it is judged that the relative position relationship between the first electronic device and the second electronic device meets a preset condition, the first electronic device establishes a communication connection with the second electronic device and acquires data of a first part of a first object needed to be displayed on the first display unit; a first application program corresponding to the first object is synchronously executed in the second electronic device; and the data of the first part is displayed on the first display unit while data of a second part in the first object different from the data of the first part is displayed on the second display unit. Thus, the present application controls two electronic devices to be spliced together automatically for display of the first object, i.e., output content of an application program, displayed on the first display unit by judging whether the relative position relationship between the two electronic devices meets a preset condition, so as to achieve executing the same program on the two electronic devices. Therefore, the electronic device in the present application effectively solves the technical problem that when two electronic devices are placed together, they cannot be spliced together automatically for display of output content of an application program, so as to achieve executing the same program on the two electronic devices, and achieves the technical effect of splicing two electronic devices together automatically for display of output content of an application program when they are placed together, so as to achieve executing the same program on the two electronic devices.

2. The present application controls two electronic devices to be spliced together automatically for display of the first object, i.e., output content of an application program, displayed on the first display unit by judging whether the relative position relationship between the two electronic devices meets a preset condition, so as to achieve executing the same program on the two electronic devices. Therefore, a user only needs to place the two electronic devices together in use, simplifying the operation and enhancing user experience.

Another Embodiment

Another embodiment of the disclosure provides an information processing method and an electronic device, capable of solving the technical problem in the art that when a virtual platform comprised of multiple platforms is used, different display parameters of display units of the multiple platforms result in inconsistent image display parameters.

In order to solve the above technical problem, the general concept of the technical solutions according to the embodiment of the present disclosure is as follows.

In an embodiment of the disclosure, a first display parameter of the first display unit and a second display parameter of the second display unit are acquired at a first time; it is judged whether the first display parameter is consistent with the second display parameter; and if the first display parameter is inconsistent with the second display parameter, at least one of the first display unit, the second display unit, the first part or the second part is adjusted at a second time after the first time, so that a third display parameter when the first part is displayed on the first display unit is consistent with a fourth display parameter when the second part is displayed on the second display unit.

It can be seen that, with the method according to the present embodiment, the electronic device adjusts at least one of the first display unit, the second display unit, the first part or the second part, so that a third display parameter when the first part is displayed on the first display unit is consistent with a fourth display parameter when the second part is displayed on the second display unit. This effectively solves the technical problem that when a virtual platform comprised of multiple platforms is used, different display parameters of display units of the multiple platforms result in inconsistent image display parameters, and achieves the technical effect that when a virtual platform comprised of the multiple platforms is used, the image display parameters are consistent even if the display parameters of display units of the multiple platforms are different.

Further, the display parameters of the display units of the multiple platforms are adjusted to make the image display parameters consistent. Therefore, it enables a user to clearly view a display image of the display screen and get a better experience.

In order to better understand the above technical solutions, the above technical solutions will be described in detail below in conjunction with the accompanying drawings of the specification and specific embodiments.

The embodiment of the present disclosure provides an information processing method applied in a first electronic device including a first display unit, for example, a tablet computer, a smart phone, a palm computer, a smart television etc. A first part of an object is displayed on the first display unit, and a second part of the object is displayed on a second display unit of a second electronic device. This further includes acquiring first display content corresponding to an application when the application is executed in the first electronic device and/or the second electronic device, the first display content being a part of the display content corresponding to the application; enabling the first display content to be displayed on the first display unit; wherein, the display content is displayed collectively on the first display unit and the second display unit, and each of the first display unit and the second display unit displays a part of the display content. In an embodiment, the first electronic device and the second electronic device are for example a tablet computer and a smart phone respectively, and the display unit of the tablet computer and the display unit of the smart phone are spliced together through a splicing technology. When an application is running in the tablet computer and/or the smart phone, for example, a picture is opened, the display unit of the tablet computer displays a first display part of the complete content of the picture, and the display unit of the smart phone displays a second display part of the complete content of the picture. The first display part and the second display part constitute the complete display content of the picture.

Of course, in a practical application, the first electronic device and the second electronic device may each be a tablet computer, or a smart television and a tablet computer respectively, or a notebook computer and a smart television, which is not limited in the present application.

Figure 6:
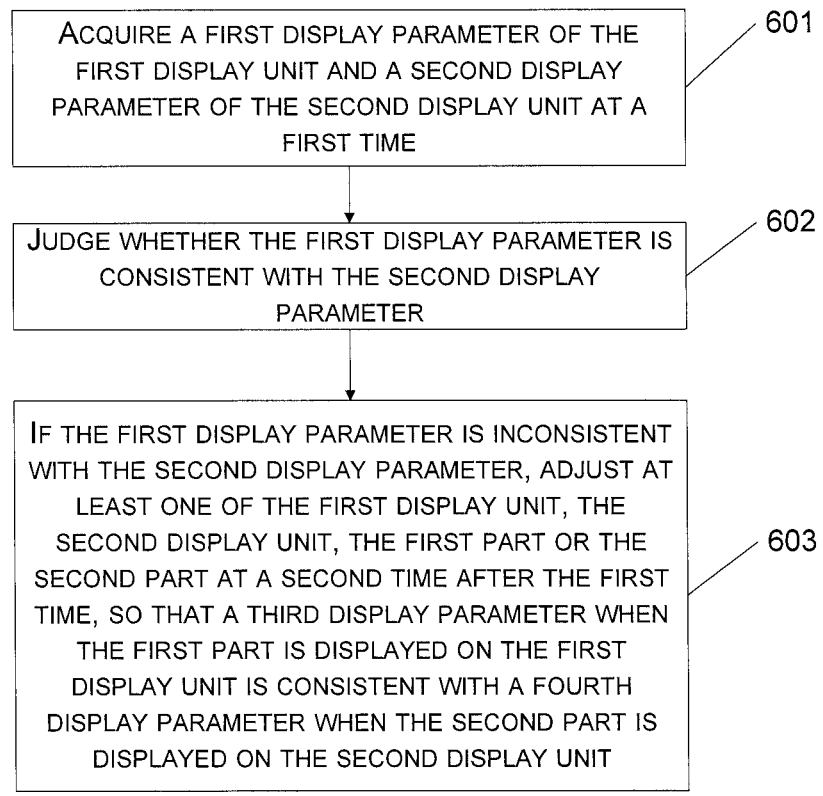
FIG. 6 is a schematic flowchart of an information processing method according to another embodiment of the disclosure.

When the first part of the object is displayed on the first display unit and the second part of the object is displayed on the second display unit of the second electronic device, with reference to FIG. 6 illustrating a flowchart of an information processing method according to the present embodiment, the method includes: Step 601: acquiring a first display parameter of the first display unit and a second display parameter of the second display unit at a first time; Step 602: judging whether the first display parameter is consistent with the second display parameter; and Step 603: if the first display parameter is inconsistent with the second display parameter, adjusting at least one of the first display unit, the second display unit, the first part or the second part at a second time after the first time, so that a third display parameter when the first part is displayed on the first display unit is consistent with a fourth display parameter when the second part is displayed on the second display unit.

In step 601, the first display parameter of the first display unit corresponds to the second display parameter of the second display unit, and each of the first display parameter and the second display parameter is one of a display size, a resolution, brightness or aberration, or any combination thereof.

Taking the above example as an example as well, assume that the first electronic device and the second electronic device are a tablet computer and a smart phone respectively, and each of the first display parameter of the display unit of the tablet computer and the second display parameter of the display unit of the smart phone is one of a display size, a resolution, brightness or aberration, or any combination thereof. When the display unit of the tablet computer and the display unit of the smart phone are spliced together through a splicing technology, the tablet computer or the smart phone acquires the display parameters of the respective display units of the two electronic devices by an operating system, the display parameters including a display size, a resolution, brightness and aberration. Specifically, for example, after the first electronic device acquires the display parameter of its own, the first electronic device generates and transmits an operation instruction for acquiring the display parameter of the second electronic device to the second electronic device. For example, after the display unit of the tablet computer and the display unit of the smart phone are spliced together, the tablet computer generates and transmits an operation instruction to the smart phone, and after the smart phone receives the operation instruction, the smart phone transmits a display parameter of its own to the tablet computer.

Of course, in a practical application, the first display parameter and the second display parameter may also include parameters such as a contrast, a tone, a saturation etc., which is not limited in the present application.

After the first display parameter of the first display unit and the second display parameter of the second display unit are acquired at a first time in step 601, step 102 of judging whether the first display parameter is consistent with the second display parameter is performed in the method according to the embodiment of the present application.

In an embodiment, after the tablet computer acquires the display parameters of the respective display units of the two electronic devices in step 602, the tablet computer compares whether the display sizes, the resolutions, the brightness values and the aberration values of the respective display units of the two electronic devices are the same respectively by a comparator. Of course, in a practical application, when the first display parameter and the second display parameter include other display parameters such as a contrast, a tone, a saturation etc., the tablet computer also needs to compare the other display parameters such as a contrast, a tone, a saturation etc. of the respective display units of the two electronic devices.

After it is judged whether the first display parameter is consistent with the second display parameter in step 602, step 603 of if the first display parameter is inconsistent with the second display parameter, adjusting at least one of the first display unit, the second display unit, the first part or the second part at a second time after the first time, so that a third display parameter when the first part is displayed on the first display unit is consistent with a fourth display parameter when the second part is displayed on the second display unit is performed in the method according to the embodiment of the present application.

In a practical application, step 603 may be implemented in multiple manners according to different types of the display parameters, and the implementations of step 603 will be described below by way of example.

In an embodiment, when a first display size of the first display unit is inconsistent with a second display size of the second display unit, adjusting at least one of the first display unit, the second display unit, the first part or the second part includes: adjusting the first display size and/or the second display size, so that the adjusted first display size is consistent with the adjusted second display size; or adjusting a display size of the first part and/or a display size of the second part, so that the adjusted display size of the first part is consistent with the adjusted display size of the second part.

Figure 7:
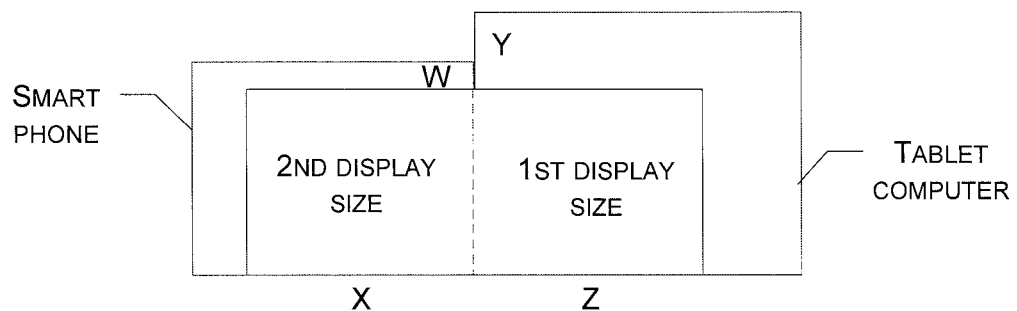
FIG. 7 is an schematic diagram of an effect after a display size is adjusted according to another embodiment of the disclosure.

In a specific implementation, after for example a tablet computer acquires a display size of 10 inches of its own and a display size of 8 inches of a smart phone, the tablet computer calculates that a ratio between the display size of its own and the display size of the smart phone is 1.25:1 by a calculator, i.e., the first display size of the first display unit is inconsistent with the second display size of the second display unit. At this time, the tablet computer may reduce the display size of its own by 20%, so that the display size of its own and the display size of the smart phone each are 8 inches; or the tablet computer reduces a display size of the first part, i.e., a display size of a picture of its own, by 20%, so that the display size of the picture on its own display screen is consistent with that on the display screen of the smart phone. The adjusted effect may be learned with reference to FIG. 7, where a size of a display unit of the tablet computer is Y*Z, a size of a display unit of the smart phone is W*X, and a side W of the smart phone and a side Y of the tablet computer are spliced together through a splicing technology.

Of course, in a practical application, a display size of 10 inches of the tablet computer can also be adjusted into a display size of 7.5 inches or 7 inches, and the a display size of 8 inches of a corresponding smart phone also needs to be adjusted into a display size of 7.5 inches or 7 inches, as long as the display size when the first part is displayed on the first display unit is consistent with the display size when the second part is displayed on the second display unit.

Alternatively, in another embodiment, when a first resolution of the first display unit is inconsistent with a second resolution of the second display unit, adjusting at least one of the first display unit, the second display unit, the first part or the second part includes: adjusting the first resolution and/or the second resolution, so that the adjusted first resolution is consistent with the adjusted second resolution; or adjusting a resolution of the first part and/or a resolution of the second part, so that the adjusted resolution of the first part is consistent with the adjusted resolution of the second part.

In a specific implementation, after a tablet computer acquires a resolution of 1024*768 of a display unit of its own and a resolution of 940*640 of a display unit of a smart phone, the tablet computer transmits an adjustment instruction to the smart phone to adjust the resolution of the display unit of the smart phone into 1024*768, or the tablet computer transmits an adjustment instruction to the smart phone to adjust a resolution of a picture displayed on the display unit of the smart phone into 1024*768, so that the resolution of the picture displayed on the display unit of the tablet computer is consistent with the resolution of the picture displayed on the display unit of the smart phone.

Of course, in a practical application, a resolution of 1024*768 of the tablet computer can also be adjusted into a resolution of 940*640, as long as the resolution when the first part is displayed on the first display unit is consistent with the resolution when the second part is displayed on the second display unit.

Further, when the first display size of the first display unit is inconsistent with the second display size of the second display unit and the first resolution of the first display unit is inconsistent with the second resolution of the second display unit, adjusting the first display unit, the second display unit, the first part and the second part includes:

adjusting the first resolution and/or the second resolution and adjusting the first display size and/or the second display size, so that the adjusted first resolution is consistent with the adjusted second resolution and the adjusted first display size is consistent with the adjusted second display size; or adjusting the resolution of the first part and/or the resolution of the second and adjusting the display size of the first part and/or the display size of the second part, so that the adjusted resolution of the first part is consistent with the adjusted resolution of the second part and the adjusted display size of the first part is consistent with the adjusted display size of the second part.

In a specific implementation, the tablet computer may firstly adjust the resolution of the display unit of its own or the smart phone, so that the resolution of the picture displayed on the display screen of the tablet computer is consistent with the resolution of the picture displayed on the display screen of the smart phone, and then the tablet computer adjusts the display size of its own or the smart phone, so that the display size of the picture displayed on the display screen of its own is consistent with the display size of the picture displayed on the display screen of the smart phone. Of course, in a practical application, the tablet computer may also firstly adjust the display size of its own or the smart phone, and then adjust the resolution of the display unit of its own or the smart phone, or adjust the display size and the resolution of its own or the smart phone simultaneously.

Alternatively, when the brightness or aberration of the first display unit is inconsistent with the brightness or aberration of the second display unit, the electronic device may adjust the setting parameters of the operating system, so that the brightness or aberration of the two electronic devices is consistent. Of course, in a practical application, when other parameters such as a contrast, a tone, a saturation etc. of the display units of the two electronic devices are inconsistent, they can also be adjusted through the setting parameters of the operating system, as long as the display parameters of the display units of the two electronic devices are consistent.

Thus, it can be seen from the above detail description of the implementation of the information processing method according to the present embodiment, the electronic device adjusts at least one of the first display unit, the second display unit, the first part or the second part, so that a third display parameter when the first part is displayed on the first display unit is consistent with a fourth display parameter when the second part is displayed on the second display unit. This effectively solves the technical problem that when a virtual platform comprised of multiple platforms is used, different display parameters of display units of the multiple platforms result in inconsistent image display parameters, and achieves the technical effect that when a virtual platform comprised of the multiple platforms is used, the image display parameters are consistent even if the display parameters of display units of the multiple platforms are different.

Based on the same inventive concept, an embodiment of the disclosure further provides an electronic device for implementing the information processing method according to the embodiments including the above embodiment, such as a phone, a tablet computer, a palm computer etc.

Figure 8:
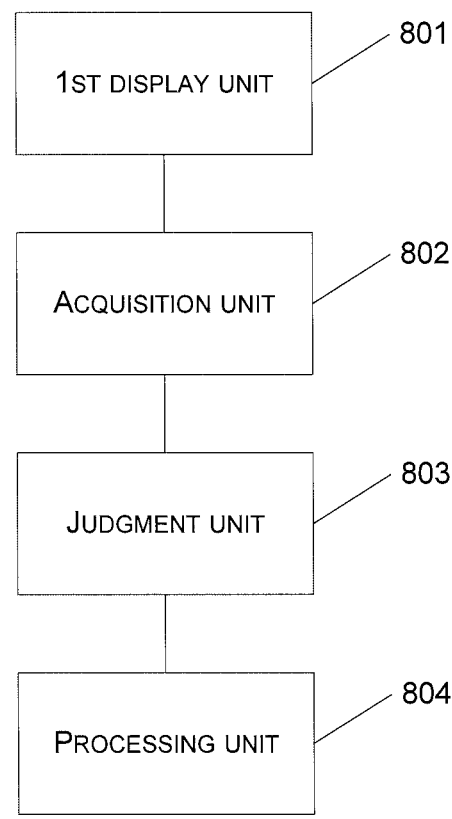
FIG. 8 is a structure block diagram of an electronic device according to another embodiment of the disclosure.

As shown in FIG. 8, the electronic device includes: a first display unit 801; an acquisition unit 802 configured to acquire a first display parameter of the first display unit 801 and a second display parameter of the second display unit at a first time when the first part of the object is displayed on the first display unit 801 and the second part of the object is displayed on the second display unit of the second electronic device; a judgment unit 803 configured to judge whether the first display parameter is consistent with the second display parameter; and a processing unit 804 configured to adjust at least one of the first display unit 801, the second display unit, the first part or the second part at a second time after the first time when a judgment result of the judgment unit 803 is NO, so that a third display parameter when the first part is displayed on the first display unit 801 is consistent with a fourth display parameter when the second part is displayed on the second display unit.

Alternatively, the first display parameter corresponds to the second display parameter, the third parameter corresponds to the fourth parameter, and each of these display parameters is one of a display size, a resolution, brightness and aberration, or any combination thereof.

Alternatively, when a first display size of the first display unit 801 is inconsistent with a second display size of the second display unit, the processing unit 804 is further configured to: adjust the first display size and/or the second display size, so that the adjusted first display size is consistent with the adjusted second display size; or adjust a display size of the first part and/or a display size of the second part, so that the adjusted display size of the first part is consistent with the adjusted display size of the second part.

Alternatively, when a first resolution of the first display unit 801 is inconsistent with a second resolution of the second display unit, the processing unit 804 is further configured to: adjust the first resolution and/or the second resolution, so that the adjusted first resolution is consistent with the adjusted second resolution; or adjust a resolution of the first part and/or a resolution of the second part, so that the adjusted resolution of the first part is consistent with the adjusted resolution of the second part.

Alternatively, when the first display size of the first display unit 801 is inconsistent with the second display size of the second display unit and the first resolution of the first display unit 801 is inconsistent with the second resolution of the second display unit, the processing unit 804 is further configured to adjust the first resolution and/or the second resolution and the first display size and/or the second display size, so that the adjusted first resolution is consistent with the second resolution and the adjusted first display size is consistent with the adjusted second display size; or adjust the resolution of the first part and/or the resolution of the second part and the display size of the first part and/or the display size of the second part, so that the adjusted resolution of the first part is consistent with the adjusted resolution of the second part and the adjusted display size of the first part is consistent with the adjusted display size of the second part.

Alternatively, the processing unit 804 is further configured to acquire first display content corresponding to an application when the application is running in the first electronic device and/or the second electronic device, the first display content being a part of the display content corresponding to the application; and enable the first display content to be displayed on the first display unit; wherein, the display content is displayed collectively on the first display unit and the second display unit, and each of the first display unit and the second display unit displays a part of the display content.

With one or more embodiments from the above embodiments in the disclosure, at least the following technical effects can be implemented.

In an embodiment of the disclosure, an induction parameter is acquired by an induction unit; a position relationship between the electronic device and an operator of the electronic device when viewing the display unit is determined based on the induction parameter; and a display image on the display unit and a display effect of displaying the display image are determined at least based on the position relationship.

It can be seen that, with the method according to the present embodiment, the electronic device adjusts at least one of the first display unit, the second display unit, the first part or the second part, so that a third display parameter when the first part is displayed on the first display unit is consistent with a fourth display parameter when the second part is displayed on the second display unit. This effectively solves the technical problem that when a virtual platform comprised of multiple platforms is used, different display parameters of display units of the multiple platforms result in inconsistent image display parameters, and achieves the technical effect that when a virtual platform comprised of the multiple platforms is used, the image display parameters are consistent even if the display parameters of display units of the multiple platforms are different.

Further, the display parameters of the display units of the multiple platforms are adjusted to make the image display parameters consistent. Therefore, it enables a user to clearly view a display image of the display screen and get a better experience.

Those skilled in the art should appreciate that the embodiments of the disclosure can be provided as methods, systems, or computer program products. Therefore, forms such as hardware-only embodiments, software-only embodiments, or embodiments combining software and hardware can be used in the disclosure. In addition, forms such as a computer program product which is implemented on one or more of computer usable storage media (including but not limited to a disk memory, an optical memory etc.) with computer usable program codes can be used in the disclosure.

The disclosure is described with reference to the flowcharts and/or block diagrams of the methods, devices (systems) and computer program products according to the embodiments of the disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Obviously, various modifications and variants can be made to the disclosure by those skilled in the art without departing from the spirit and scope of the disclosure. Therefore, these modifications and variants are to be encompassed by the disclosure if they fall within the scope of the disclosure as defined by the claims and their equivalents.

What is claimed is:

1. An information processing method applied in a first electronic device comprising a first display unit and being capable of communicating with a second electronic device comprising a second display unit, the method comprising:
    acquiring a first position parameter of the first electronic device during a first motion, the first position parameter comprising a first direction of the first motion, the first position parameter further comprising a first start time and a first end time corresponding to the first motion; and
    acquiring a second position parameter of the second electronic device during a second motion from the second electronic device, the second position parameter comprising a second direction of the second motion, the second position parameter further comprising a second start time and a second end time corresponding to the second motion;
    judging, based on the first position parameter and the second position parameter, whether a relative position relationship between the first electronic device and the second electronic device meets a preset condition, to acquire a first judgment result;
    when the first judgment result is YES, establishing, by the first electronic device, a communication connection with the second electronic device;
    acquiring data of a first part of a first object needed to be displayed on the first display unit; and
    synchronously executing a first application program corresponding to the first object in the second electronic device, and displaying the first part of the first object on the first display unit while displaying a second part of the first object on the second display unit, wherein the second part of the first object is different than the first part of the first object.

2. The method of claim 1, wherein, before said acquiring a first position parameter of the first electronic device and a second position parameter of the second electronic device, the method further comprises:
    synchronizing the first electronic device with the second electronic device through a first timeline module in the first electronic device and a second timeline module in the second electronic device.

3. The method of claim 2, wherein, when or after said synchronizing the first electronic device with the second electronic device through a first timeline module in the first electronic device and a second timeline module in the second electronic device, the method further comprises:

acquiring a device time difference value representing a time difference between the first timeline module of the first electronic device and the second timeline module of the second electronic device.

4. The method of claim 1, wherein, after said acquiring a first position parameter of the first electronic device and a second position parameter of the second electronic device, the method further comprises:
  detecting to acquire a first distance value between the first electronic device and the second electronic device at a third time after the first end time and the second end time.

5. The method of claim 4, wherein, said judging, based on the first position parameter and the second position parameter, whether a relative position relationship between the first electronic device and the second electronic device meets a preset condition to acquire a first judgment result further comprises:
  judging whether the first direction is opposite to the second direction, to acquire a second judgment result;
  when the second judgment result is YES, judging whether a first time difference value between the first start time and the second start time is equal to the device time difference value, to acquire a third judgment result; and
  when the third judgment result is YES, judging whether the first distance value is smaller than a preset distance value, to acquire the first judgment result.

6. The method of claim 4, wherein, said judging, based on the first position parameter and the second position parameter, whether a relative position relationship between the first electronic device and the second electronic device meets a preset condition to acquire a first judgment result further comprises:
  judging whether the first direction is opposite to the second direction, to acquire a second judgment result;
  when the second judgment result is YES, judging whether a second time difference value between the first end time and the second end time is equal to the device time difference value, to acquire a fourth judgment result; and
  when the fourth judgment result is YES, judging whether the first distance value is smaller than a preset distance value, to acquire the first judgment result.

7. The method of claim 4, wherein, said judging, based on the first position parameter and the second position parameter, whether a relative position relationship between the first electronic device and the second electronic device meets a preset condition to acquire a first judgment result further comprises:
  judging whether the first direction is opposite to the second direction, to acquire a second judgment result;
  when the second judgment result is YES, judging whether a first time difference value between the first start time and the second start time is equal to the device time difference value, to acquire a third judgment result;
  when the third judgment result is YES, judging whether a second time difference value between the first end time and the second end time is equal to the device time difference value, to acquire a fifth judgment result; and
  when the fifth judgment result is YES, judging whether the first distance value is smaller than a preset distance value, to acquire the first judgment result.

8. The method of claim 1, wherein, said acquiring a first position parameter of the first electronic device and a second position parameter of the second electronic device further comprises:
  detecting to acquire the first position parameter of a first trigger sensor arranged at a first position in the first electronic device, the first position parameter comprising a signal parameter representing whether there is a first induced current signal passing through the first trigger sensor; and
  detecting to acquire the second position parameter of a second trigger sensor arranged at a second position in the second electronic device, the second position parameter comprising a signal parameter representing whether there is a second induced current signal corresponding to the first induced current signal passing through the second trigger sensor.

9. The method of claim 8, wherein, said judging, based on the first position parameter and the second position parameter, whether a relative position relationship between the first electronic device and the second electronic device meets a preset condition to acquire a first judgment result further comprises:
  when the first position parameter indicates that there is the first induced current signal passing through the first trigger sensor and the second position parameter indicates that there is the second induced current signal passing through the second trigger sensor, judging whether the first position and the second position are in a preset correspondence relationship, to acquire the first judgment result.

10. The method of claim 1, further comprising:
  acquiring a first display parameter of the first display unit and a second display parameter of the second display unit at a first time;
  judging whether the first display parameter is consistent with the second display parameter; and
  if the first display parameter is inconsistent with the second display parameter, adjusting at least one of the first display unit, the second display unit, the first part of the first object and the second part of the first object at a second time after the first time, so that a third display parameter when the first part of the first object is displayed on the first display unit is consistent with a fourth display parameter when the second part of the first object is displayed on the second display unit.

11. The method of claim 10, wherein, the first display parameter corresponds to the second display parameter, the third parameter corresponds to the fourth parameter, and each of the display parameters is one of a display size, a resolution, brightness and aberration, or any combination thereof.

12. The method of claim 11, wherein, when a first display size of the first display unit is inconsistent with a second display size of the second display unit, said adjusting at least one of the first display unit, the second display unit, the first part of the first object and the second part of the first object comprises:
  adjusting the first display size and/or the second display size, so that the adjusted first display size is consistent with the adjusted second display size; or
  adjusting a display size of the first part of the first object and/or a display size of the second part of the first object, so that the adjusted display size of the first part of the first object is consistent with the adjusted display size of the second part of the first object.

13. A first electronic device being capable of communicating with a second electronic device comprising a second display, the first electronic device comprising:
  a first display;
  a hardware processor configured to
    acquire a first position parameter of the first electronic device during a first motion, the first position parameter comprising a first direction of the first motion, the first position parameter further comprising a first start time and a first end time corresponding to the first motion;

acquire a second position parameter of the second electronic device during a second motion from the second electronic device, the second position parameter comprising a second direction of the second motion, the second position parameter further comprising a second start time and a second end time corresponding to the second motion;

judge, based on the first position parameter and the second position parameter, whether a relative position relationship between the first electronic device and the second electronic device meets a preset condition, to acquire a first judgment result;

establish a communication connection between the first electronic device and the second electronic device when the first judgment result is YES;

acquire data of a first part of a first object needed to be displayed on the first display; and synchronously execute a first application program corresponding to the first object in the second electronic device, and display the data of the first part of the first object on the first display while displaying data of a second part of the first object on the second display of the second electronic device, wherein the second part of the first object is different than the first part of the first object.

14. The first electronic device of claim 13, wherein the hardware processor is further configured to:

synchronize the first electronic device with the second electronic device through a first timeline module in the first electronic device and a second timeline module in the second electronic device.

15. The first electronic device of claim 14, wherein the hardware processor is further configured to:

acquire a device time difference value representing a time difference between the first timeline module of the first electronic device and the second timeline module of the second electronic device when or after the first electronic device is synchronized with the second electronic device through a first timeline module in the first electronic device and a second timeline module in the second electronic device.

16. The first electronic device of claim 14, wherein the hardware processor is further configured to:

acquire a first display parameter of the first display and a second display parameter of the second display at a first time when the first part of the first object is displayed on the first display and the second part of the first object is displayed on the second display of the second electronic device;

judge whether the first display parameter is consistent with the second display parameter; and adjust at least one of the first display, the second display, the first part of the first object and the second part of the first object at a second time after the first time when a judgment result is NO, so that a third display parameter when the first part of the first object is displayed on the first display is consistent with a fourth display parameter when the second part of the first object is displayed on the second display.

* * * * *